(12) United States Patent
Aurongzeb et al.

(10) Patent No.: US 10,846,939 B2
(45) Date of Patent: *Nov. 24, 2020

(54) AUGMENTED REALITY WORKSPACE SYSTEM

(71) Applicant: Dell Products L.P., Round Rock, TX (US)

(72) Inventors: Deeder M. Aurongzeb, Austin, TX (US); Michiel Sebastiaan Emanuël Petrus Knoppert, Amsterdam (NL)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,308

(22) Filed: Jan. 3, 2020

(65) Prior Publication Data
US 2020/0143601 A1 May 7, 2020

Related U.S. Application Data

(63) Continuation of application No. 15/678,937, filed on Aug. 16, 2017, now Pat. No. 10,529,136.

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G06F 1/1601* (2013.01);
(Continued)

(58) Field of Classification Search
CPC .................................................... G06T 19/006
See application file for complete search history.

(56) References Cited

U.S. PATENT DOCUMENTS

2012/0249416 A1 10/2012 Maciocci et al.
2014/0232747 A1 8/2014 Sugimoto et al.
(Continued)

OTHER PUBLICATIONS

"The Leader in Mixed Reality Technology—HoloLens, Microsoft HoloLens," 2017, 5 Pages, Microsoft, https://www.microsoft.com/en-us/hololens.
(Continued)

*Primary Examiner* — Charles Tseng
(74) *Attorney, Agent, or Firm* — Haynes and Boone, LLP

(57) ABSTRACT

An augmented reality workspace system includes a physical display device, a user tracking subsystem, and an augmented reality display subsystem, all coupled to a computing system. The computing system uses the augmented reality display subsystem to display an augmented reality element that appears located in a three-dimensional volume immediately adjacent the physical display device as viewed through the augmented reality display subsystem, and uses the physical display device to display a two-dimensional element in a manner that is coordinated with the augmented reality element displayed using the augmented reality display subsystem. When the computing system receives user tracking information from the user tracking subsystem that indicates a user interaction with the augmented reality element, it provides for a coordinated modification of the display of each of the augmented reality element and the two-dimensional element by the augmented reality display subsystem and the physical display device, respectively.

20 Claims, 15 Drawing Sheets

(51) Int. Cl.
*G06T 11/60* (2006.01)
*G06F 3/01* (2006.01)
*G06F 1/16* (2006.01)
*G02B 27/01* (2006.01)
*G06F 3/03* (2006.01)

(52) U.S. Cl.
CPC .............. *G06F 3/011* (2013.01); *G06F 3/012* (2013.01); *G06F 3/017* (2013.01); *G06F 3/0304* (2013.01); *G06T 11/60* (2013.01); *G02B 2027/014* (2013.01); *G02B 2027/0178* (2013.01); *G06F 2203/04806* (2013.01)

(56) References Cited

U.S. PATENT DOCUMENTS

| | | |
|---|---|---|
| 2015/0160736 A1 | 6/2015 | Fujiwara |
| 2016/0027216 A1 | 1/2016 | Da Veiga et al. |
| 2016/0196694 A1 | 7/2016 | Lindeman |

OTHER PUBLICATIONS

"Adjutant: A Framework for Flexible Human-Machine Collaborative Systems," IEEE/RSJ International Conference on Intelligent Robots and Systems Conference Paper, DOI: 10.1109/IROS.2014.6942739, ResearchGate GmbH, https://www.researchgate.net/Publication/275355059_Adjutant_A_framework_for_flexible_human_machine_collaborative_systems, Abstract, 2014.

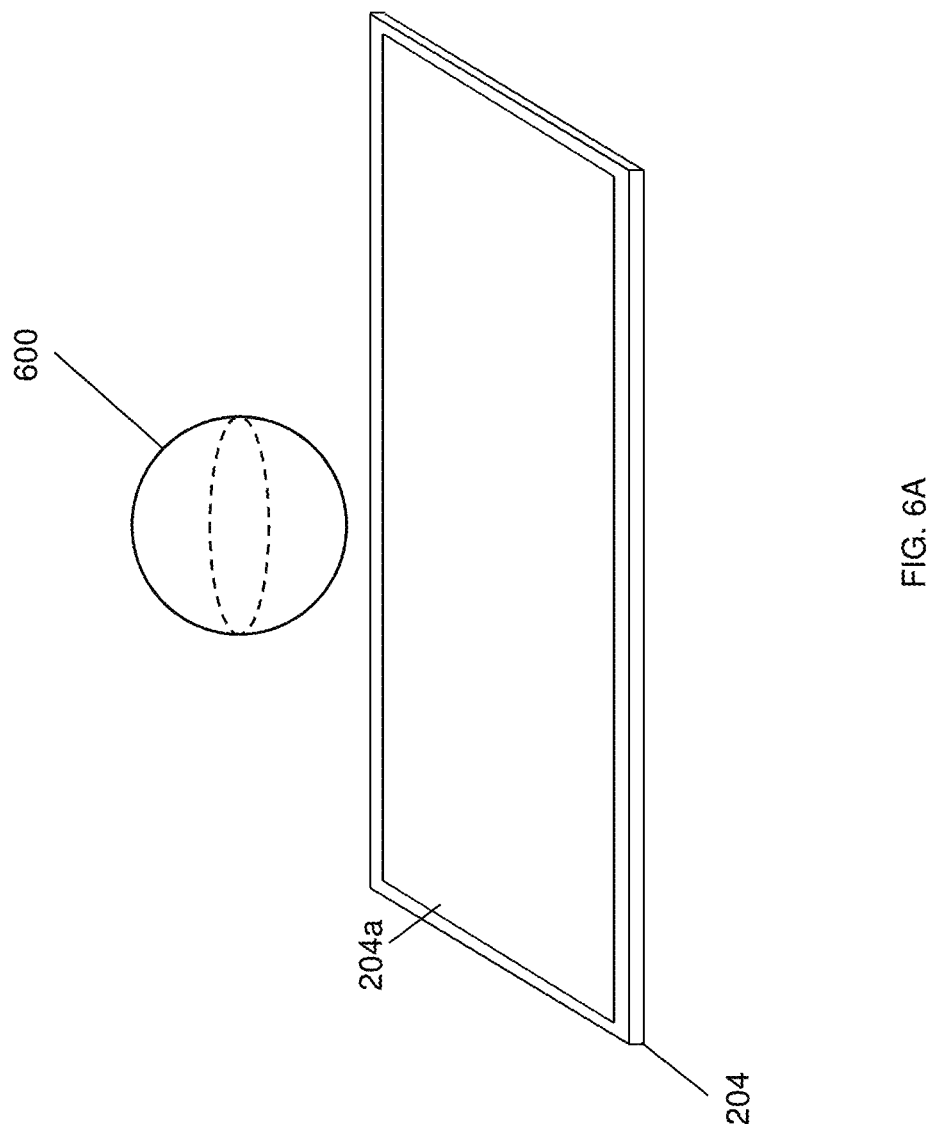

AUGMENTED REALITY WORKSPACE SYSTEM

CROSS-REFERENCE TO RELATED APPLICATIONS

This is a continuation application to U.S. Utility application Ser. No. 15/678,937 filed Aug. 16, 2017, entitled "Augmented Reality Workspace System," the disclosure of which is incorporated herein by reference in its entirety.

BACKGROUND

The present disclosure relates generally to information handling systems, and more particularly to information handling systems that provide augmented reality workspaces.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes used to provide augmented reality environments in which a live or indirect view of a physical, real-world environment is augmented by computer-generated sensory input that may include video, audio, and/or other data. However, the integration of augmented reality environments with physical computing workspaces is limited. In general, conventional physical computing workspaces that utilize augmented reality environments operate by either replacing physical display devices with the augmented reality workspace (e.g., the users physical environment is augmented with virtual display devices that are provided in place of any physical display devices, and those virtual display devices are then utilized as the workspace), or by providing the augmented reality elements of the workspace separately from the physical display devices (e.g., a physical display device is provided for a user to work on, with augmented reality elements viewable separately from (e.g., outside the users field of view of) the physical display devices.) As such, while augmented reality workspaces are available, they do no leverage benefits that can be realized when the augmented reality elements are integrated with physical computing workspace.

Accordingly, it would be desirable to provide an improved augmented reality workspace.

SUMMARY

According to one embodiment, an Information Handling System (IHS) includes a processing system; and a memory system is that is coupled to the processing system and that includes instructions that, when executed by the processing system, cause the processing system to provide an augmented reality display engine that is configure to: provide, for display on an augmented reality display subsystem and in order to appear to be located in a three-dimensional volume immediately adjacent a physical display device as viewed through the augmented reality display subsystem, a first augmented reality element; provide, for display on the physical display device, a two-dimensional element that is coordinated with the first augmented reality element displayed on the augmented reality display subsystem; receive, from a user tracking subsystem, first user tracking information; analyze the first user tracking information to determine at least one first user interaction with the first augmented reality element; modify, in response to the at least one first user interaction, the display of the first augmented reality element by the augmented reality display subsystem; and modify, in response to the at least one first user interaction, the display of the two-dimensional element by the physical display device in a manner that is coordinated with the modification of the display of the first augmented reality element by the augmented reality display subsystem.

BRIEF DESCRIPTION OF THE DRAWINGS

FIG. 6A is a perspective view illustrating an embodiment of an augmented reality element rendered adjacent a physical display device in the augmented reality workspace system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
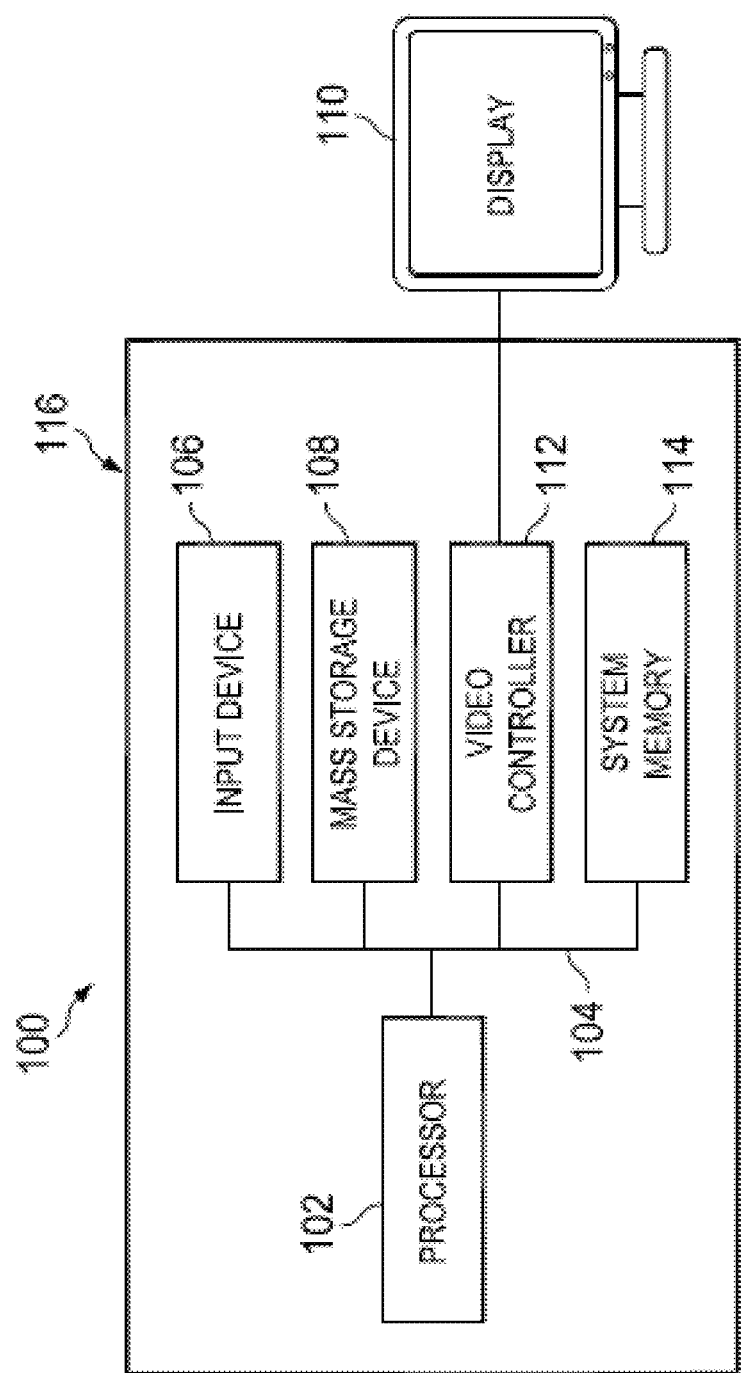
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
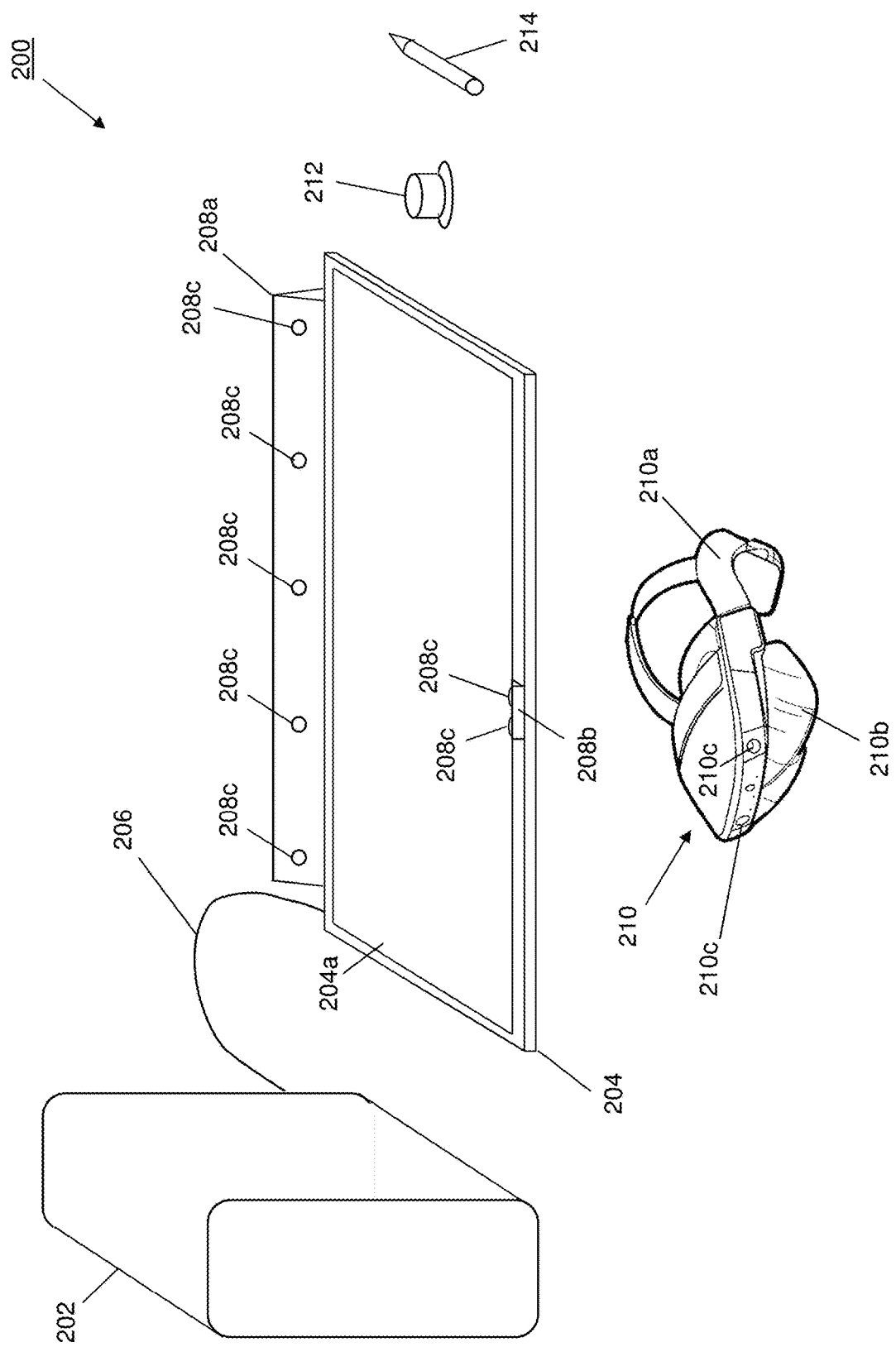
FIG. 2 is a perspective view illustrating an embodiment of an augmented reality workspace system.

Referring now to FIG. 2, an embodiment of an augmented reality workspace system 200 is illustrated. In the illustrated embodiment, the augmented reality workspace system 200 includes a computing device 202 that may be the IHS 100 discussed above with reference to FIG. 1, and/or that may include some of all of the components of the IHS 100. One of skill in the art in possession of the present disclosure will recognize that while the computing device 202 is illustrated as a desktop computing device, other types of computing devices (e.g., laptop/notebook computing devices and/or other mobile computing devices, computing devices integrated into other components of the augmented reality workspace system 200, and/or other types of computing devices) will fall within the scope of the present disclosure as well. As discussed in further detail below, the computing device 202 may be coupled to other components of the augmented reality workspace system 200 via wired and/or wireless couplings. Furthermore, while a separate computing device 202 is illustrated in FIG. 2, the functionality of the computing device 202 may instead by provided by a computing system that may be at least partially distributed across the components of the augmented reality workspace system 200.

For example, the augmented reality workspace system 200 of the illustrated embodiment includes a physical display device 204 that is connected to the computing device 202 by a wired connection 206, although wireless connections between the computing device 202 and the physical display device 204 (or integration of at least some of the computing device functionality discussed below in the physical display device 204) will fall within the scope of the present disclosure as well. In an embodiment, the physical display device 204 may include the display 110 discussed above with reference to FIG. 1. The physical display device 204 includes a display screen 204a that, in the embodiments illustrated and discussed below, is provided in a substantially horizontal orientation relative to a user of the augmented reality workspace system 200, as well as substantially parallel to the support surface upon which it is located (e.g., a working surface of a desk.) For example, one of skill in the art in possession of the present disclosure will recognize that display screens have been traditionally provided in substantially vertical orientations relative to users, as well as substantially perpendicularly to their support surfaces (e.g., the working surface of the desk discussed above), and that the display screen 204a of the physical display device 204 is described below as provided in a substantially horizontal orientation that is rotated substantially ninety degrees from those substantially vertical orientations. For example, the physical display device 204 may be provided as part of a "smart desk" that provides a horizontally oriented, touch-input display device (which may be utilized by itself or in conjunction with a vertically oriented display device), although other horizontally oriented display screens will fall within the scope of the present disclosure as well. Furthermore, the provisioning of the physical display device 204 and its display screen 204a in other orientations (e.g., the vertical orientation discussed above) will fall within the scope of the present disclosure as well.

In the illustrated embodiment, a user tracking subsystem 208a and 208b is integrated with the physical display device 204, although a user tracking subsystem that is separate from the physical display device 204 (and separately coupled to the computing device 202 via a wired or wireless connection) will fall within the scope of the present disclosure as well. As such, in some embodiments the user tracking subsystem 208 and 208b may include at least some of the computing device functionality described below for the physical display device 204. The user tracking subsystem 208a and 208b may include a plurality of user tracking devices 208c that may be provided by infrared (IR) sensors, IR sensor arrays (e.g., "IR castors"), three-dimensional cameras (e.g., if the processing system in the computing system has sufficient processing capabilities), and/or a variety of other user tracking devices that would be apparent to one of skill in the art in possession of the present disclosure. While the augmented reality workspace system 200 is illustrated with the user tracking subsystem 208a positioned at the "top" of the physical display device 204 and the user tracking subsystem 208b positioned at the "bottom" of the physical display device 204, user tracking subsystems with different numbers of components in different configurations and/or orientations will fall within the scope of the present disclosure as well.

In the illustrated embodiment, an augmented reality display subsystem 210 is included with the augmented reality workspace system 200, and provides a head-mounted user tracking and display subsystem. For example, the augmented reality display subsystem 210 includes a chassis 210a that is configured to be worn on a user's head such that a display device 210b is positioned in front of the user's eyes. In the discussions below, the display device 210b is provided by a transparent Organic Light Emitting Device (OLED) display device, although other display devices that provide the functionality discussed below may fall within the scope of the present disclosure as well. The augmented reality display subsystem 210 may also include a plurality of cameras 210c that are configured to capture images in the field of view of a user wearing the augmented reality display subsystem 210. In the examples discussed below, the augmented reality display subsystem 210 is wirelessly coupled to the computing device 202, although wired connections will fall within the scope of the present disclosure as well. While in the embodiments discussed below, much of the computing device processing for the display of images by the augmented reality display subsystem 210 is performed by the computing device 202 in order to provide a relatively small and lightweight augmented reality display subsystem 210, in other embodiments the augmented reality display subsystem 210 may perform at least some of the computing device functionality discussed below. While not explicitly illustrated, the augmented reality display subsystem 210 may include a variety of other components for use in the user tracking functionality discussed below, including IR markers (e.g., for use by IR sensors or IR sensor arrays in the user tracking subsystem 208a and 208b), accelerometers, gyroscopes, locations sensors, and/or a variety of other tracking components that would be apparent to one of skill in the art in possession of the present disclosure. In experimental embodiments, the augmented reality display subsystem 210 was provided by a META 2® headset provided by META® company of California, United States, although other augmented reality display subsystems will fall within the scope of the present disclosure as well. However, while a specific augmented reality display subsystem has been described, one of skill in the art in possession of the present disclosure will recognize that light field display devices, projection display devices, and/or other augmented reality display subsystems may be substituted for the augmented reality display subsystem 210 while remaining within the scope of the present disclosure.

In the illustrated embodiment, the augmented reality workspace system 200 also includes a totem device 212 and a pen device 214, each of which may be wirelessly connected to the computing device 202 (although wired connections will fall within the scope of the present disclosure as well), or capable of being tracked by the augmented reality display subsystem 210 and/or the user tracking subsystem 208a and 208b. Furthermore, each of the totem device 212 and the pen device 214 may include tracking components such as IR markers (e.g., for use by IR sensors or IR sensor arrays in the user tracking subsystem 208a and 208b), cameras, accelerometers, gyroscopes, locations sensors, and/or a variety of other tracking components that would be apparent to one of skill in the art in possession of the present disclosure. While a specific augmented reality workspace system has been described, one of skill in the art in possession of the present disclosure will recognize that augmented reality workspace systems may include a variety of components in a variety of different configurations in order to provide for conventional augmented reality workspace functionality, as well as the functionality discussed below, while remaining within the scope of the present disclosure.

Figure 3:
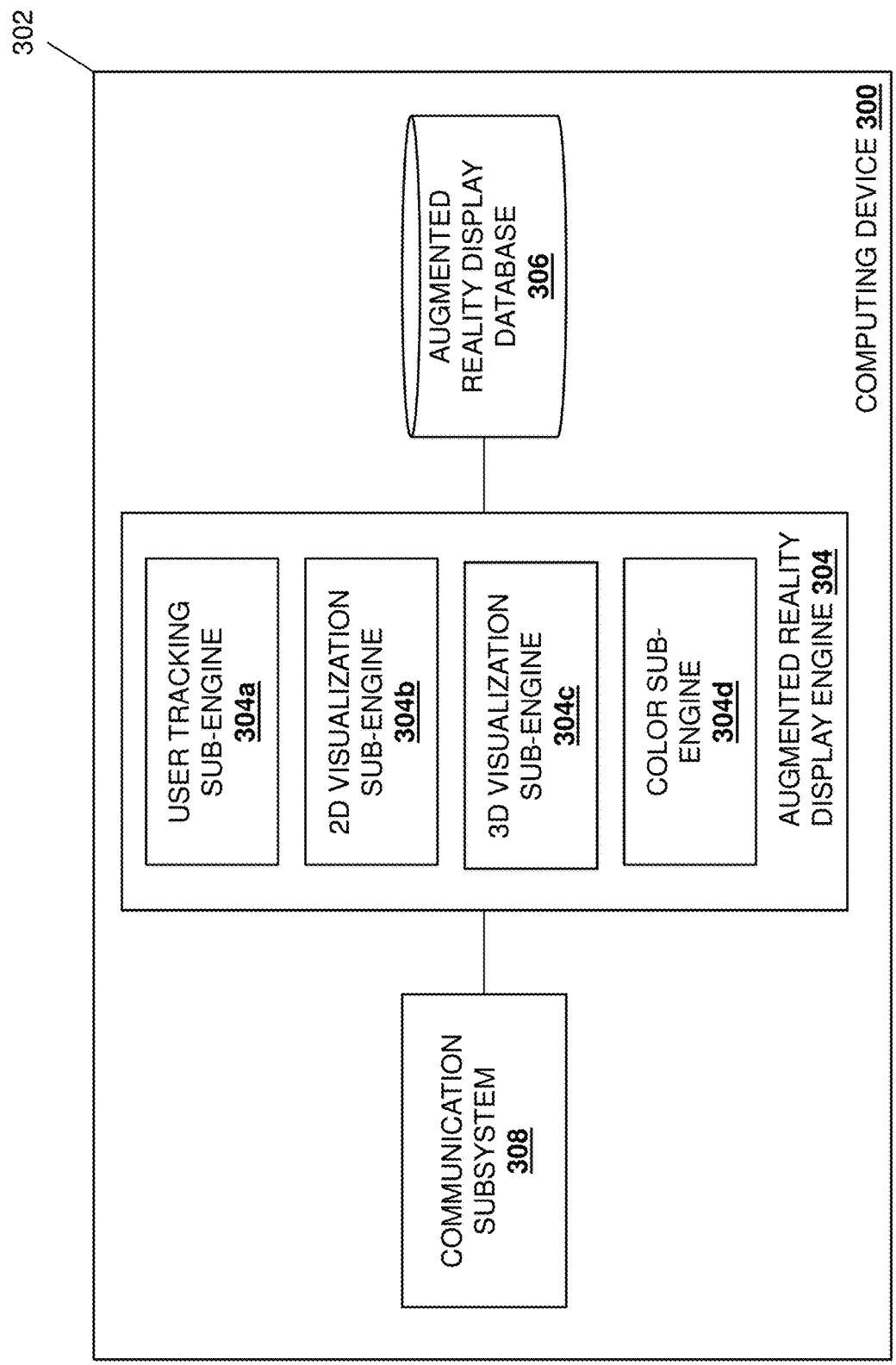
FIG. 3 is a schematic view illustrating an embodiment of a computing system used in the augmented reality workspace system of FIG. 2.

Referring now to FIG. 3, an embodiment of a computing device 300 is illustrated that may be the computing device 202 discussed above with reference to FIG. 2. As such, the computing device 300 may be the IHS 100 discussed above with reference to FIG. 1, and/or may include some or all of the components of the IHS 100, and in specific embodiments may be a desktop computing device (although other types of computing devices will fall within the scope of the present disclosure as well, as discussed above.) Furthermore, as discussed above, while a separate computing device 300 is illustrated in FIG. 300, the functionality of the computing device 300 may instead by provided by a computing system that may be at least partially distributed across the components of the augmented reality workspace system 200. In the illustrated embodiment, the computing device 300 includes a chassis 302 that houses the components of the computing device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide an augmented reality display engine 304 that is configured to perform the functions of the augmented reality display engines and computing devices discussed below. However, as discussed above, rather than being provided in a separate computing device, the functionality and/or processing performed by the computing device as discussed below may instead be integrated into components of the augmented reality workspace system 200 (e.g., the physical display device 204, the user tracking subsystem 208a and 208b, the augmented reality display subsystem 210, etc.) while remaining within the scope of the present disclosure.

In the illustrated embodiment, the augmented reality display engine 304 includes a user tracking sub-engine 304a that may be configured to utilize user tracking information to determine the position of the user (e.g., the user's head, the user's hands, and/or other portions of the user), a two-dimensional visualization sub-engine 304*b* that may be configured to generate the two-dimensional elements on the display screen 204*a* of the physical display device 204, a three-dimensional visualization sub-engine 304*c* that may be configured to generate the augmented reality elements via the augmented reality display subsystem 210, and a color sub-engine 304*c* that may be configured to determine color details of the two-dimensional and augmented reality elements generates by the two-dimensional visualization sub-engine 304*b* and the three-dimensional visualization sub-engine 304*c*. However, while an example of specific sub-engines and components of the augmented reality display engine 304 have been illustrated and are described in more detail below, one of skill in the art in possession of the present disclosure will recognize that the augmented reality display engine 304 may include more or fewer sub-engines, and those sub-engines may be distributed across multiple different components of the augmented reality workspace system 200 (e.g., the user tracking sub-engine 304*a* provided in the user tracking subsystem 208*a* and 208*b*, two-dimensional visualization sub-engine 304*b* provided in the physical display device 204, the three-dimensional visualization sub-engine 304*c* provided in the augmented reality display subsystem 210, etc.) while remaining within the scope of the present disclosure.

The chassis 302 may also house a storage system (not illustrated, but which may include the storage device 108 discussed above with reference to FIG. 1) that is coupled to the augmented reality display subsystem 304 (e.g., via a coupling between the storage system and the processing system) and that may include an augmented reality display database 306 that is configured to store any of the information that is used to provide the functionality discussed below. The chassis 302 may also house a communication subsystem 308 that is coupled to the augmented reality display subsystem 304 (e.g., via a coupling between the communication subsystem 308 and the processing system) and that may include a Network Interface Controller (NIC) (e.g., for providing the wired connections discussed above), a wireless communication device (e.g., a BLUETOOTH® communications device, a Near Field Communications (NFC) device, a WiFi communications devices, and/or other wireless communications devices for providing the wireless connections discussed above), and/or other communications components that would be apparent to one of skill in the art in possession of the present disclosure. While a specific computing device has been illustrated and described, one of skill in the art in possession of the present disclosure will recognize that computing devices may include a variety of components in a variety of configurations in order to provide conventional computing device functionality, as well as the functionality discussed below, while remaining within the scope of the present disclosure.

Figure 4:
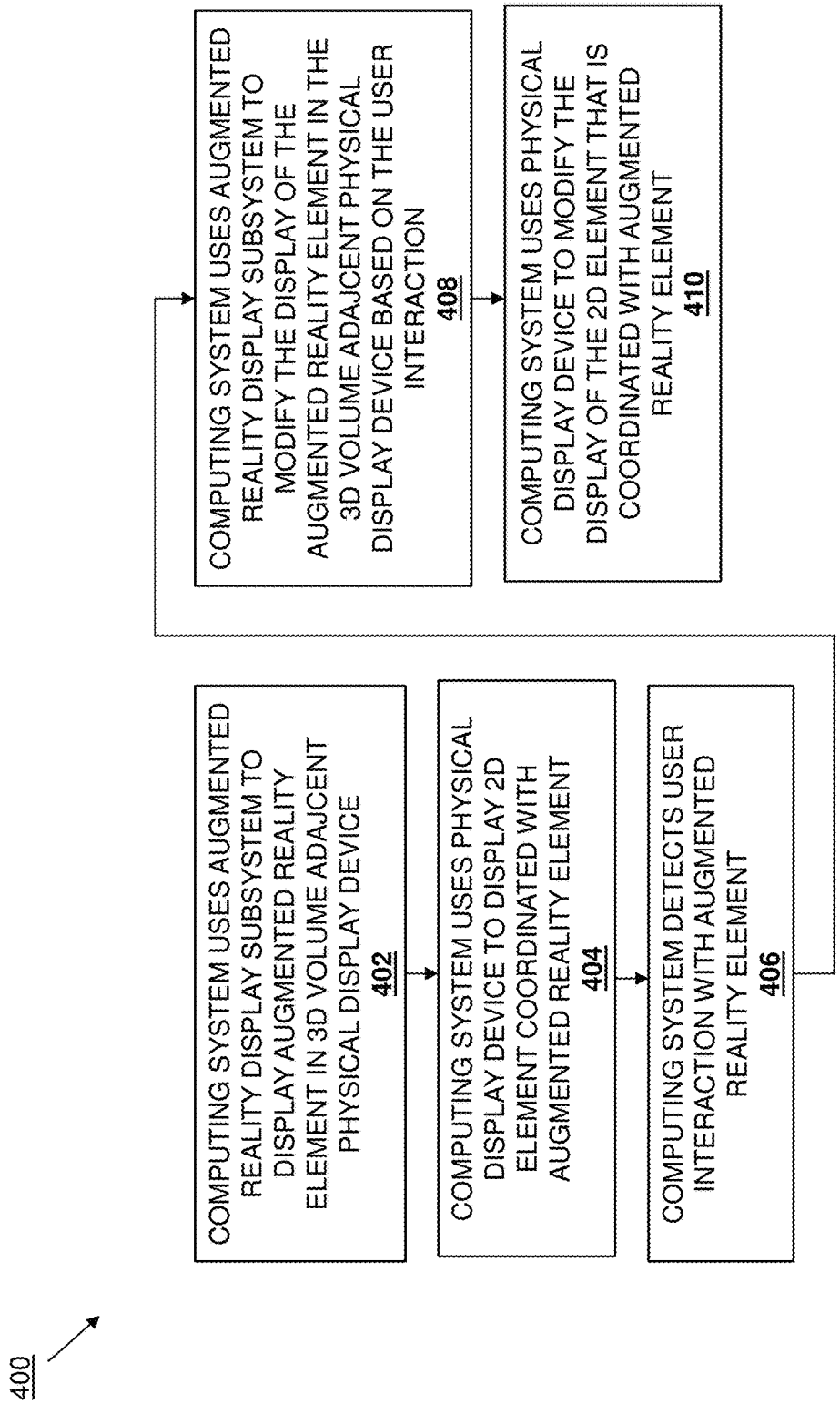
FIG. 4 is a flow chart illustrating an embodiment of a method for providing an augmented reality workspace.

Referring now to FIG. 4, an embodiment of a method 400 for providing an augmented reality workspace is illustrated. As discussed below, at least some embodiments of the systems and methods of the present disclosure provide for the integration of an augmented reality workspace with one or more physical display devices in order to provide an immersive workspace experience that coordinates the display of augmented reality elements via an augmented reality display subsystem with the display of two-dimensional elements via a physical display device that provides for productivity increases using the system. For example, the design of products using three-dimensional augmented reality elements displayed via the augmented reality display subsystem is enhanced by providing for the display of "projections", cross-sections, surfaces, and/or other features of the three-dimensional element onto the physical display device using the two-dimensional element displayed thereon, allowing for previously unavailable visualizations of the product being designed, engagement surfaces on the product being designed, and/or a variety of other benefits that will be apparent to one of skill in the art in possession of the present disclosure. Furthermore, the system may be enhanced using peripheral devices such a totems, which allow for manipulation of the three-dimensional element displayed via the augmented reality display subsystem, and pens, which may be utilized with the physical display device to allow for the augmentation of three-dimensional element displayed via the augmented reality display subsystem.

Figure 5:
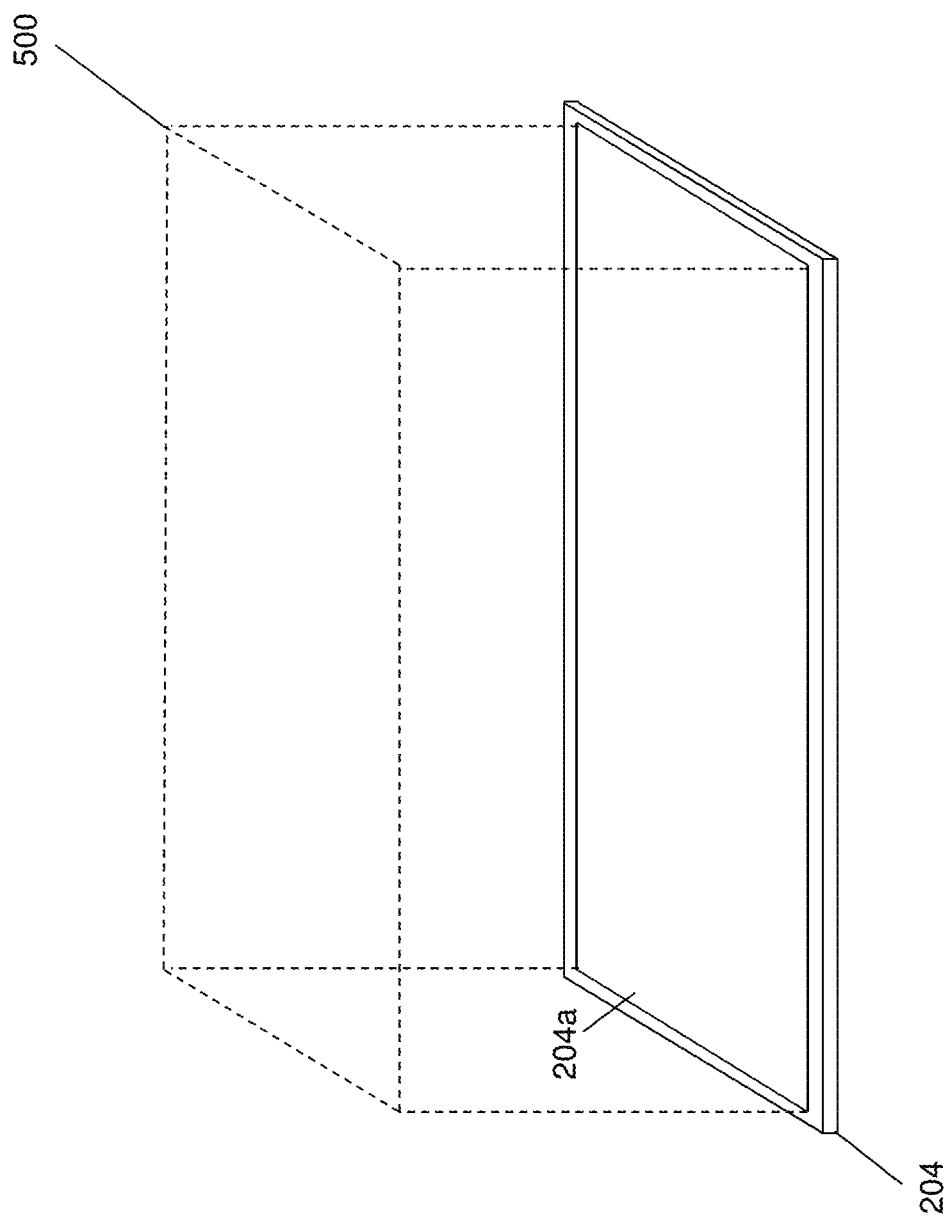
FIG. 5 is a perspective view illustrating an embodiment of a three dimensional augmented reality volume defined adjacent a physical display device in the augmented reality workspace system of FIG. 2.

The method 400 begins at block 402 where a computing system uses an augmented reality display subsystem to display an augmented reality element in a three dimensional volume adjacent a physical display device. In the embodiments discussed below, for clarity of illustration, the augmented reality workspace system 200 is illustrated with only the physical display device 204 and without the augmented reality display subsystem 210 and the user tracking subsystem 208*a* and 208*b*. However, one of skill in the art in possession of the present disclosure will recognize that the augmented reality display subsystem 210 and the user tracking subsystem 208*a* and 208*b* may be utilized throughout the method 400 to provide the functionality discussed below. With reference to FIG. 5, at or before block 402 (e.g., upon and/or during startup of the augmented reality workspace system 200, the user tracking sub-engine 304*a* and the three-dimensional visualization sub-engine 304*c* in the augmented reality display engine 304 may operate to receive information provided by the augmented reality display subsystem 210 and the user tracking subsystem 208*a* and 208*b*, and define a three-dimensional volume 500 immediately adjacent the display screen 204*a* on the physical display device 204*a*.

For example, the user tracking sub-engine 304*a* in the augmented reality display engine 304 may receive user tracking information that may be generated by the augmented reality display subsystem 210 (e.g., user tracking information related to the location, orientation, and/or movement of the user's head), generated by the user tracking subsystem 208*a* and 208*b* (e.g., user tracking information related to the location, orientation, and/or movement of any part of the user's body detectable by the user tracking subsystem 208*a* and 208*b*), and/or generated by any other component in the system 200. In addition, the three-dimensional visualization sub-engine 304*c* in the augmented reality display engine 304 may retrieve physical display device information (e.g., information describing the location, orientation, size, and/or other characteristics of the physical display device 204) from the physical display device 204 and/or from the augmented reality display database 306, as well as receive image information from the cameras 210*c* on the augmented reality display subsystem 210. The user tracking sub-engine 304*a* may then provide the user tracking information to the three-dimensional visualization sub-engine 304*c*, and the three-dimensional visualization sub-engine 304*c* may use the user tracking information, the physical display device information, the image information, and/or any other available information to recognize the physical display device 204 in real-time as it is being viewed through the augmented reality display subsystem 210, and define the three-dimensional volume 500 adjacent the display screen 204*a* on the physical display device 204 as it is viewed through the augmented reality display subsystem 210. As such, one of skill in the art in possession of the present disclosure will recognize that the three dimensional volume 500 remains stationary relative to the view of the physical display device 204 via the augmented reality display subsystem 210 even when a user wearing that augmented reality display subsystem 210 moves their head and changes their view of the physical display device 204.

While a specific example of the definition of the three-dimensional volume adjacent the physical display device 204 has been described, one of skill in the art in possession of the present disclosure will recognize that a variety of techniques for defining such a three-dimensional volume adjacent a physical object will fall within the scope of the present disclosure as well. Furthermore, while the three-dimensional volume 500 is illustrated and has been described as being defined by the boundaries of the display screen 204a on the physical display device 204, the three-dimensional volume 500 may be defined to extend outside the boundaries of the display screen 204a, or within the boundaries of the display screen 204a, while remaining within the scope of the present disclosure. Further still, while the three-dimensional volume 500 is illustrated as having an upper boundary, in some embodiments, the three-dimensional volume may extend upward without a boundary.

In some embodiments, the definition of the three dimensional volume 500 adjacent the physical display device 204 may create a plurality of displays zones. For example, a primary display zone may exist within the three dimensional volume 500 and may be utilized to provide for the display of augmented reality elements that are coordinated with the display of two-dimensional elements on the physical display device 204 as discussed below, a secondary zone may exist immediately adjacent the three-dimensional volume 500 and may be utilized to provide for the display of augmented reality elements such as tools, menus, and libraries, and a tertiary zone may exist outside of the secondary zone and may be utilized to provide for the display of augmented reality elements that provide reference materials, content consumption, and/or other information. However, while specific display zones have been described, one of skill in the art in possession of the present disclosure will recognize that display zones may be defined for a variety of different purposes other than those mentioned above while remaining within the scope of the present disclosure.

Referring now to FIG. 6A, in an embodiment of block 402, the three-dimensional visualization sub-engine 304c in the augmented reality display engine 304 may operate to use the augmented reality display subsystem 210 to render, display, or otherwise provide an augmented reality element 600 in the three dimensional volume 500 adjacent the physical display device 204. For example, at block 402, a user of the system 200 may provide the three-dimensional visualization sub-engine 304c object information that describes how the augmented reality element 600 should be displayed, and/or instruct the three-dimensional visualization sub-engine 304c to retrieve object information from the augmented reality display database 306 that describes how the augmented reality element 600 should be displayed.

At block 402, the user tracking sub-engine 304a in the augmented reality display engine 304 may also receive user tracking information that may be generated by the augmented reality display subsystem 210 (e.g., user tracking information related to the location, orientation, and/or movement of the user's head), generated by the user tracking subsystem 208a and 208b (e.g., user tracking information related to the location, orientation, and/or movement of any part of the user's body detectable by the user tracking subsystem 208a and 208b), and/or generated by any other component in the system 200. Furthermore, at block 402 the three-dimensional visualization sub-engine 304c in the augmented reality display engine 304 may receive image information from the cameras 210c on the augmented reality display subsystem 210. The user tracking sub-engine 304a may then provide that user tracking information to the three-dimensional visualization sub-engine 304c, and the three-dimensional visualization sub-engine 304c may use the user tracking information, the physical display device information, the image information, the object information, and/or any other available information to generate augmented reality element information and provide that augmented reality element information to the augmented reality display subsystem 210. The augmented reality display subsystem 210 may then use that augmented reality element information to display the augmented reality element 600 in the three-dimensional volume 500 adjacent the display screen 204a on the physical display device 204 as it is viewed through the augmented reality display subsystem 210. As such, one of skill in the art in possession of the present disclosure will recognize that, absent a user interaction with the augmented reality element 600 (discussed below), the augmented reality element 600 may remain stationary relative to the view of the physical display device 204 via the augmented reality display subsystem 210 even when a user wearing that augmented reality display subsystem 210 moves their head and changes their view of the physical display device 204.

In an embodiment of block 402, the color sub-engine 304d in the augmented reality display engine 304 may operate to adjust colors that are used to display the augmented reality element 600 to provide for a coloring on the augmented reality element 600 that is consistent and/or coordinated with the coloring of the physical space in which it is being viewed. For example, the color sub-engine 304d may utilize gamut and hue feedback from the cameras 210c and/or other sensors on the augmented reality display subsystem 210 (and/or other components in the system 200), receive information from ambient light sensors provided in the augmented reality display subsystem 210 (and/or other components in the system 200), utilize color information, brightness information, and/or other display information from the physical display device 204, and compare difference in hue and gamut, information related to ambient light, and the physical display device information discussed above in order to render the color utilized on the augmented reality element 600 at block 402 (and in later blocks of the method 400.)

While a specific example of the display of an augmented reality element adjacent the physical display device 204 has been described, one of skill in the art in possession of the present disclosure will recognize that a variety of techniques for rendering, displaying, or otherwise providing such an augmented reality element adjacent a physical object will fall within the scope of the present disclosure as well. Furthermore, while the augmented reality element 600 is illustrated as being a three-dimensional element, the augmented reality element 600 may be displayed as a two-dimensional element while remaining within the scope of the present disclosure as well.

Figure 6B:
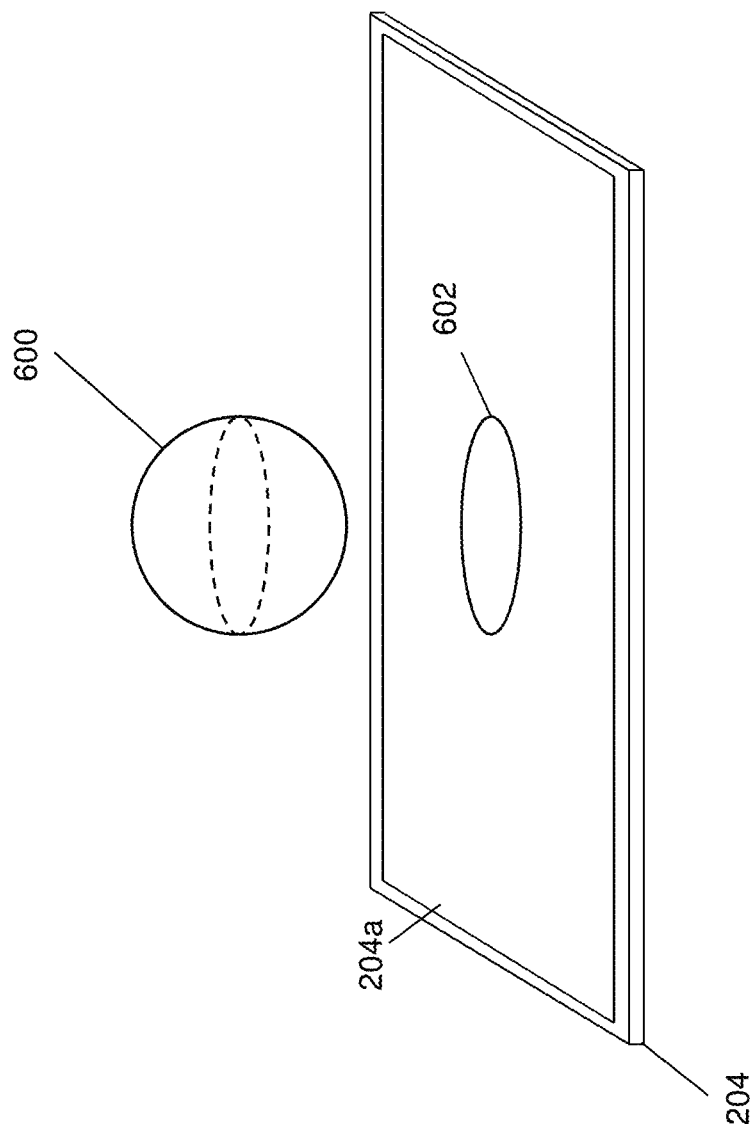
FIG. 6B is a perspective view illustrating an embodiment of a two-dimensional element displayed on the physical display device in a coordinated manner with the augmented reality element rendered adjacent the physical display device in the augmented reality workspace system of FIG. 2.

The method 400 then proceeds to block 404 where the computing system uses the physical display device to display a two dimensional element that is coordinated with the augmented reality element. Referring now to FIG. 6B, in an embodiment of block 404, the two-dimensional visualization sub-engine 304b in the augmented reality display engine 304 may operate in cooperation with the three-dimensional visualization sub-engine 304c in the augmented reality display engine 304 to render, display, or otherwise provide a two-dimensional element 602 on the display screen 204a of the physical display device 204, with that two-dimensional element coordinated with the three-dimensional element 600 displayed adjacent the physical display device 204. For example, at block 404, a user of the system 200 may have provided the two-dimensional visualization sub-engine 304b object information that describes how the two-dimensional element 602 should be displayed, and/or instruct the two-dimensional visualization sub-engine 304b to retrieve object information from the augmented reality display database 306 that describes how the two-dimensional element 602 should be displayed.

For example, at block 404, the two-dimensional visualization sub-engine 304b in the augmented reality display engine 304 may use the object information, as well as the augmented reality element information generated by the three-dimensional visualization sub-engine 304c, to generate two-dimensional element information and provide that two-dimensional element information to the physical display device 204. The physical display device 204 may then use that two-dimensional element information to display the two-dimensional element 602 on the display screen 204a of the physical display device 204 in a coordinated manner with the augmented reality element 600. In some embodiments, the two-dimensional element 602 may be coordinated with the augmented reality element 600 by providing a cross-sectional view of the augmented reality element 600. For example, the two-dimensional element 602 may provide a cross-sectional view of the augmented reality element 600 along the dotted line illustrated in the augmented reality element 600 of FIG. 6B (which may be selected by the user via the user interactions discussed below.) In some embodiments, the two-dimensional element 602 may be coordinated with the augmented reality element 600 by providing a projected view of the augmented reality element 600. For example, the two-dimensional element 602 may provide a projected view of the augmented reality element 600 that illustrates a surface of the augmented reality element 600, that illustrates a shadow cast by the augmented reality element (e.g., in response to an augmented reality light source that may be positioned as desired by the user), and/or that illustrated a variety of other projected views that would be apparent to one of skill in the art in possession of the present disclosure.

In some embodiments, the two-dimensional element 602 may be coordinated with the augmented reality element 600 by providing a surface-engagement view of the augmented reality element 600. For example, augmented reality element 600 may include a textured surface (not illustrated), and the two-dimensional element 602 may provide a surface-engagement view of the augmented reality element 600 that illustrates how the textured surface of the augmented reality element 600 would engage a support surface, the amount of force that would be experienced by different portions of the textured surface of the augmented reality element 600 when engaging a support surface, and/or a variety of other surface-engagement views that would be apparent to one of skill in the art in possession of the present disclosure. While specific examples of the display of two-dimensional elements coordinated with augmented reality elements have been described, one of skill in the art in possession of the present disclosure will recognize that a variety of techniques for rendering such coordinated two-dimensional elements/augmented reality elements will fall within the scope of the present disclosure as well.

As discussed in detail below, following block 404 the computing device 300 operates to detect user interactions at block 406, and then modify the display of the augmented reality element 600 at block 408, and modify the display of two-dimensional element 602 at block 410 in a manner that is coordinated with the augmented reality element 600. Several different examples of user interactions and the associated coordinated modifications of the display of the augmented reality element 600 and the two-dimensional element 602 are described separately below, but one of skill in the art in possession of the present disclosure will recognize that any of functionality described in the examples below may be combined with functionality described in the other examples while remaining within the scope of the present disclosure. Furthermore, the specific examples provided below are not meant to be limiting, and one of skill in the art in possession of the present disclosure will recognize how the teachings provided herein may be extended to a variety of functionality that will fall within the scope of the present disclosure.

In a first embodiment, the method 400 may proceed to block 406 where the computing system detects a user interaction with the augmented reality element. In the first embodiment, at block 406, the user tracking sub-engine 304a in the augmented reality display engine 304 may receive user tracking information that may be generated by the user tracking subsystem 208a and 208b (e.g., user tracking information related to the location, orientation, and/or movement of any part of the user's body detectable by the user tracking subsystem 208a and 208b), and/or generated by any other component in the system 200. The user tracking sub-engine 304a may then provide that user tracking information to the three-dimensional visualization sub-engine 304c. Furthermore, at block 406 the three-dimensional visualization sub-engine 304c in the augmented reality display engine 304 may receive image information from the cameras 210c on the augmented reality display subsystem 210. At block 406, the three-dimensional visualization sub-engine 304c may then use the user tracking information, the image information, and/or any other available information to detect at least one user interaction with the augmented reality element 600.

Figure 7A:
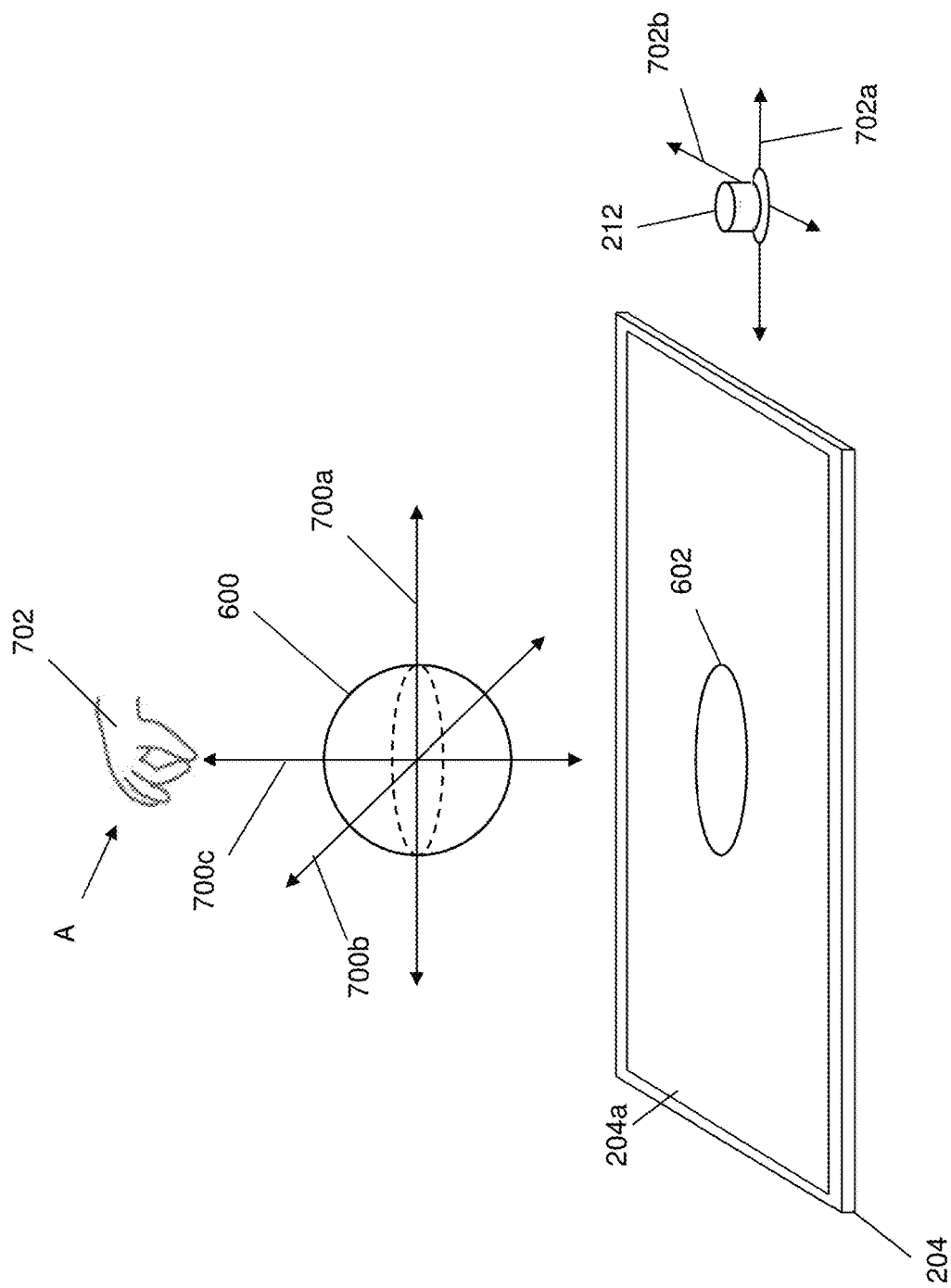
FIG. 7A is a perspective view illustrating an embodiment of a user interacting with the augmented reality element of FIG. 6.

Referring now to FIG. 7A, the rendering, displaying, or otherwise provisioning of the augmented reality element 600 by the three-dimensional visualization sub-engine 304c in the augmented reality display engine 304 may include the defining of a plurality of augmented reality element axis, including the augmented reality element X-axis 700a, the augmented reality element Y-axis, and the augmented reality element Z-axis 700c illustrated in FIG. 7A. In this first embodiment of block 406, the user may move their hand 702 into the three-dimensional volume 500 located adjacent the physical display device 204 and perform a hand gesture A that, in FIG. 7A, is illustrated as a "pinch" gesture, and that is followed by a translational movement of the hand 702. The user tracking sub-engine 304a may receive the user tracking information generated by the user tracking subsystem 208a and 208b in response to that hand movement, and then provide that user tracking information to the three-dimensional visualization sub-engine 304c. The three-dimensional visualization sub-engine 304c may also receive image information generated by the camera(s) 210c on the augmented reality display subsystem 210 in response to that hand movement as well. The three-dimensional visualization sub-engine 304c may then analyze the user tracking information, the image information, and/or any other available information to detect the hand gesture A being performed within the three-dimensional volume 500, followed by the translational movement of the hand 702. In the specific embodiment illustrated in FIG. 7A, the hand gesture A is detected adjacent the augmented reality element Z-axis 700c prior to the translational movement of the hand 702, and at block 406 that hand gesture A and augmented reality element Z-axis 700c may be associated with each other.

In the examples illustrated and described below, the hand gesture A (i.e., a pinch gesture) located adjacent an augmented reality element axis is associated with movement of the augmented reality element 600. However, as would be understood by one of skill in the art in possession of the present disclosure, a variety of different hand gestures may be associated with a variety of different augmented reality element actions while remaining within the scope of the present disclosure. For example, a pinch gesture that is not located adjacent an augmented reality element axis may be associated with a "zoom" action that causes the augmented reality element 600 to be displayed smaller, and a reverse-pinch gesture (i.e., when the fingers on a user's hand are moved apart from each other) may be associated with an "unzoom" action that causes the augmented reality element 600 to be displayed larger. In another example, a two-finger gesture (i.e., when an index and middle finger on a user's hand are held out while the remaining fingers are not) may be associated with movement of the augmented reality element 600. However, while a plurality of different hand gestures have been described, one of skill in the art in possession of the present disclosure will recognize that any of a variety of hand gestures may be associated with any of a variety of augmented reality element actions while remaining within the scope of the present disclosure.

Furthermore, as also illustrated in FIG. 7A, a user interaction may be detected via totem device information generated in response to translational movement of the totem device 212. For example, the user may use their hand 702 to move the totem device 212 along a totem device X-axis 702a or a totem device Y-axis 702b, and that translational movement may be reported to the three-dimensional visualization sub-engine 304c as totem device information (e.g., reported directly by the totem device 212, detected and reported by the user tracking sub-engine 304a, etc.) As such, at block 406, the three-dimensional visualization sub-engine 304c may use the totem device information generated via translational movement of the totem device 212 to detect the at least one user interaction with the augmented reality element 600. In some embodiments, the totem device 212 may be utilized on the surface of the display screen 204a of the physical display device 204. In such embodiments, the two-dimensional visualization engine 304b may be configured to recognize when a user's palm is engaging the display screen 204a along with the totem device 212, and operate to disregard that engagement of the user's palm.

In the first embodiment, the method 400 may then proceed to block 408 where the computing system uses the augmented reality display subsystem to modify the display of the augmented reality element in the three dimensional volume adjacent the physical display device based on the user interaction. With reference to FIGS. 7A, 7B, 7C, and 7D, in an embodiment of block 408, the three-dimensional visualization sub-engine 304c may determine that the user interaction detected at block 406 and, in response, modify the display of the augmented reality element 600 in the three dimensional volume 500. In this example, the hand gesture A is a pinch gesture that is performed adjacent the augmented reality element Z-axis 700c, and is followed by translational movement of the hand 702 along the augmented reality element Z-axis 700c and towards the physical display device 204. Based on that detected user interaction with the augmented reality element 600, the augmented reality visualization sub-engine 304c may modify the display of the augmented reality element 600 provided by the augmented reality display subsystem 210 to cause the augmented reality element 600 to appear to perform a translational movement through the three-dimensional volume 500 and towards the physical display device 204, as illustrated in FIGS. 7A, 7B, 7C, and 7D.

Figure 7B:
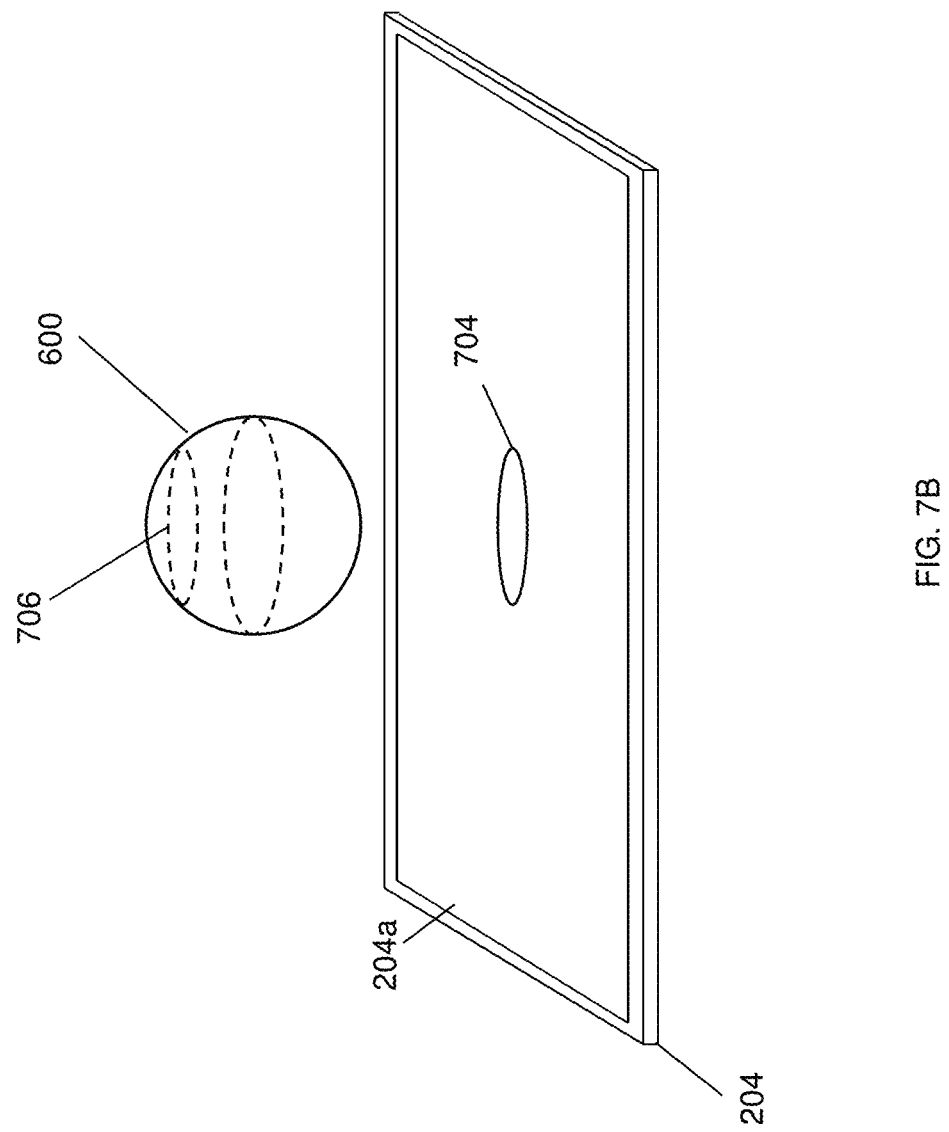
FIG. 7B is a perspective view illustrating an embodiment of the augmented reality element of FIG. 6 coordinated with the display of a two-dimensional element on the physical display device, and having moved in response to the user interaction of FIG. 7A.
Figure 7C:
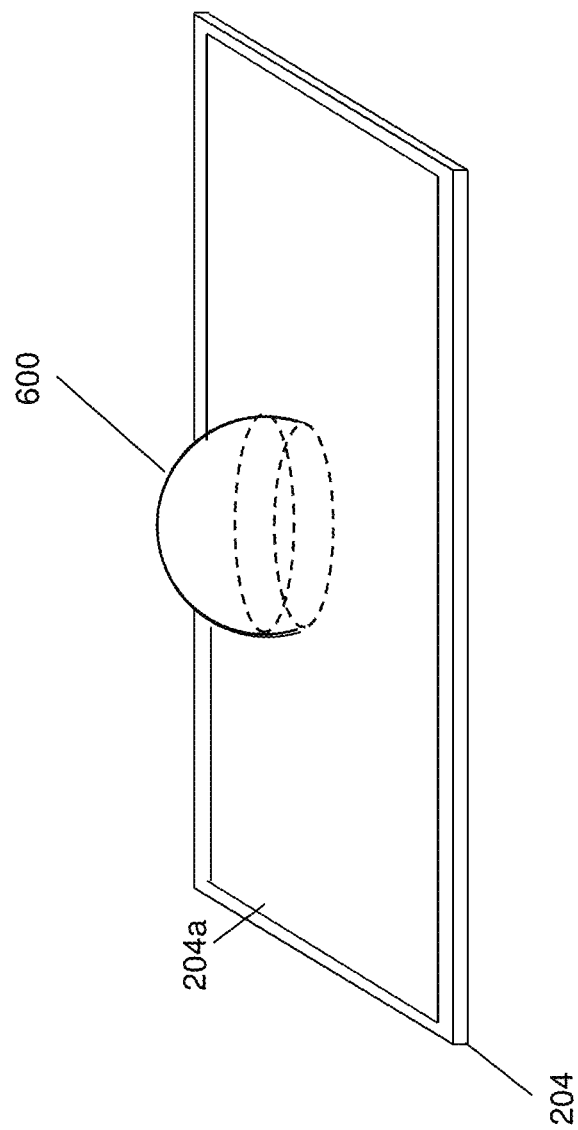
FIG. 7C is a perspective view illustrating an embodiment of the augmented reality element of FIG. 6 coordinated with the display on the physical display device, and having moved in response to the user interaction of FIG. 7A.
Figure 7D:
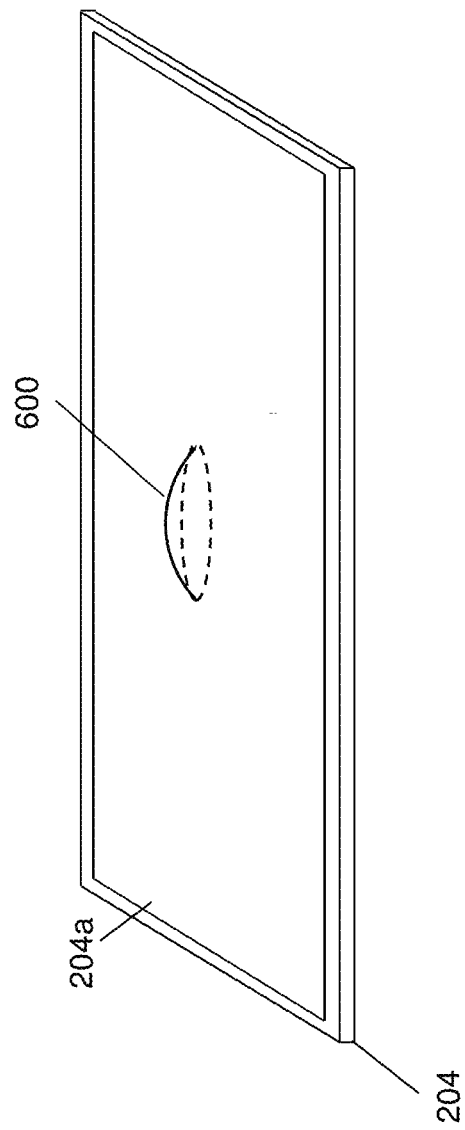
FIG. 7D is a perspective view illustrating an embodiment of the augmented reality element of FIG. 6 coordinated with the display on the physical display device, and having moved in response to the user interaction of FIG. 7A.

In the embodiment illustrated in FIGS. 7B, 7C, and 7D, as the user continues to perform the translational movement of their hand 702 while performing the hand gesture A adjacent the augmented reality element Z-axis 700c, the modified display of the augmented reality element 600 will cause the augmented reality element 600 to reach the intersection of the three-dimensional volume 500 and the display screen 204a on the physical display device 204, and appear to move into contact with the display screen on the physical display device 204. In response to this user interaction continuing (e.g., the continued translational movement of the hand 702 while performing the hand gesture A adjacent the augmented reality element Z-axis 700c), the augmented reality element 600 will move past the intersection of the three-dimensional volume 500 and the display screen 204a on the physical display device 204. As illustrated in FIGS. 7C and 7D, movement of the augmented reality element 600 past the intersection of the three-dimensional volume 500 and the display screen 204a on the physical display device 204 may cause the augmented reality visualization sub-engine 304c to modify the display of the augmented reality element 600 provided by the augmented reality display subsystem 210 to cause any portion of the augmented reality element 600 that moves past the intersection of the three-dimensional volume 500 and the display screen 204a on the physical display device 204 to not be displayed (i.e., the augmented reality element 600 appears to "disappear" into the display screen 204a.)

However, while the specific example in FIGS. 7B, 7C, and 7D illustrates a vertical translational movement of the augmented reality element 600, one of skill in the art in possession of the present disclosure will recognize that horizontal translational movements of the augmented reality element 600 will fall within the scope of the present disclosure as well. For example, the hand gesture A may be a pinch gesture that is performed adjacent the augmented reality element X-axis 700b or Y-axis 700c, and may be followed by translational movement of the hand 702 along that augmented reality element X-axis 700a or Y-axis 700b. In response, the augmented reality visualization sub-engine 304c may cause the display of the augmented reality element 600 to appear to move along that augmented reality element X-axis 700b or Y-axis 700c in substantially the same manner as discussed above. Similarly as discussed above, movement of the augmented reality element 600 in the direction of the augmented reality element X-axis 700b or Y-axis 700c may cause the augmented reality element 600 to reach a boundary of the three-dimensional volume 500, and may result in portions of the augmented reality element 600 that move beyond that boundary to "disappear" or provide for the viewing of a cross section of the augmented reality element 600 (i.e., the cross section of the augmented reality element 600 immediately adjacent that boundary.) However, continued display of portions of the augmented reality element 600 that move beyond such a boundary on the three-dimensional volume 500 will fall within the scope of the present disclosure as well.

Furthermore, the hand gesture A performed adjacent any of the augmented reality element axis as discussed above may allow the user to translate their hand 702 in the direction of any of those augmented reality element axis to have the display of the augmented reality element 600 appear to translate in substantially the same manner as discussed above. Further still, the movement of the totem device 212 as discussed above (e.g., along the totem device X-axis 702a or the totem device Y-axis 702b) may cause the augmented reality element 600 to move along a corresponding augmented reality element axis (e.g., the augmented reality element X-axis 700b or Y-axis 700c) in substantially the same manner as discussed above. In some embodiments, the totem device 212 may be utilized on the surface of the display screen 204a of the physical display device 204. In such embodiments, the two-dimensional visualization engine 304b may be configured to recognize when a user's palm is engaging the display screen 204a along with the totem device 212, and operate to disregard that engagement of the user's palm. As such, the modification of the display of the augmented reality element 600 may be caused by a variety of user actions while remaining within the scope of the present disclosure.

In the first embodiment, the method 400 may then proceed to block 410 where the computing system uses the physical display device to modify the display of the two dimensional element that is coordinated with the augmented reality element. With reference to FIGS. 7A and 7B, the translational movement of the augmented reality element 600 may cause the two-dimensional visualization sub-engine 304b to modify the display of the two-dimensional element 602 to provide a modified two-dimensional element 704. For example, as discussed above, the two-dimensional element 602 may be coordinated with the augmented reality element 600 by providing a cross-sectional view of the augmented reality element 600, and in this example that cross-sectional view may be defined by a horizontally oriented static plane (e.g., a plane that includes the augmented reality element X-axis 700a and the augmented reality element Y-axis 700b in FIG. 7A, and that is parallel to the display screen 204a) that intersects the augmented reality element 600. In response to the translational movement of the augmented reality element 602, the relative position of the augmented reality element 602 and that static plane may change, and result in the coordinated display of the modified two-dimensional element 704 that provides a different cross-section of the augmented reality element 602 (e.g., as indicated by the dotted circle 706 in FIG. 7B.) As such, different cross-sections of the augmented reality element 600 may be viewed on the physical display device 304 by performing user interactions that translate the augmented reality element 600 as discussed above. One of skill in the art in possession of the present disclosure will recognize how a cross-sectional view of the augmented reality element 600 may be provided with a vertical static plane (i.e., a static plane that includes the augmented reality element Y-axis 700b and the augmented reality element Z-axis 700c in FIG. 7A, and that is perpendicular to the display screen 204a) in substantially the same manner as described above.

As discussed above, the embodiments illustrated in FIGS. 7C and 7D describe an example where the movement of the augmented reality element 600 past the intersection of the three-dimensional volume 500 and the display screen 204a on the physical display device 204 causes the augmented reality visualization sub-engine 304c to modify the display of the augmented reality element 600 provided by the augmented reality display subsystem 210 to cause any portion of the augmented reality element 600 that moves past the intersection of the three-dimensional volume 500 and the display screen 204a on the physical display device 204 to not be displayed (i.e., to cause the augmented reality element 600 to appear to "disappear" into the display screen 204a.) In such embodiments, the cross-sectional view of (or other two-dimensional element coordination with) the augmented reality element 600 may be visualized in greater detail when the augmented reality element 600 intersects the three-dimensional volume 500 and the display screen 204a on the physical display device 204.

In other examples, the coordinated modification of the two-dimensional element 602 with the augmented reality element 600 may include providing a modified projected view of the augmented reality element 600. For example, the two-dimensional element 704 may provide a projected view of the augmented reality element 600 that illustrates different portions of the surface of the augmented reality element 600 as it translates (possible along the augmented reality element X-axis 700a or the augmented reality element Y-axis 700c rather than the augmented reality element Z-axis 700c in the illustrated embodiment), a projected view that illustrates a shadow cast by the augmented reality element 602 as it translates (e.g., in response to the augmented reality light source that may be positioned as desired by the user), and/or that illustrated a variety of other projected views that would be apparent to one of skill in the art in possession of the present disclosure.

In yet other examples, the coordinated modification of the two-dimensional element 602 with the augmented reality element 600 may include a modified surface-engagement view of the augmented reality element 600. As discussed above, augmented reality element 600 may include a textured surface (not illustrated), and the two-dimensional element 704 may provide a surface-engagement view of the augmented reality element 600 that illustrates how the textured surface of the augmented reality element 602 would engage a support surface as the augmented reality element 602 translates, the amount of force that would be experienced by different portions of the textured surface of the augmented reality element 602 as it translates when engaging a support surface, and/or a variety of other surface-engagement views that would be apparent to one of skill in the art in possession of the present disclosure. While specific examples of the display of modified coordination of the display of two-dimensional elements with augmented reality elements have been described, one of skill in the art in possession of the present disclosure will recognize that a variety of techniques for rendering such modified coordinated two-dimensional elements/augmented reality elements will fall within the scope of the present disclosure as well.

In a second embodiment, the method 400 may proceed to block 406 where the computing system detects a user interaction with the augmented reality element. In the second embodiment, at block 406, the user tracking sub-engine 304a in the augmented reality display engine 304 may receive user tracking information that may be generated by the user tracking subsystem 208a and 208b (e.g., user tracking information related to the location, orientation, and/or movement of any part of the user's body detectable by the user tracking subsystem 208a and 208b), and/or generated by any other component in the system 200. The user tracking sub-engine 304a may then provide that user tracking information to the three-dimensional visualization sub-engine 304c. Furthermore, at block 406 the three-dimensional visualization sub-engine 304c in the augmented reality display engine 304 may receive image information from the cameras 210c on the augmented reality display subsystem 210. At block 406, the three-dimensional visualization sub-engine 304c may then use the user tracking information, the image information, and/or any other available information to detect at least one user interaction with the augmented reality element 600.

Figure 8:
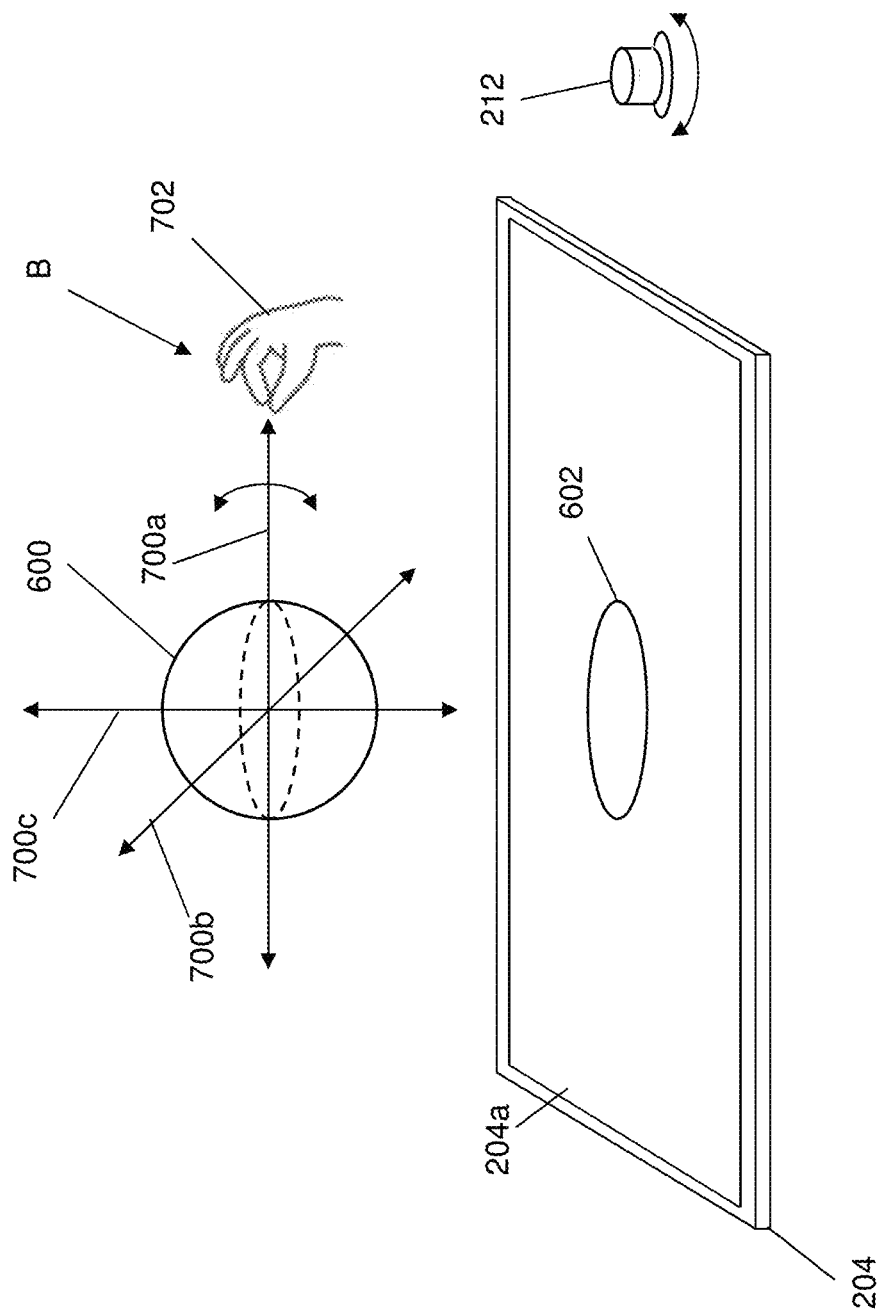
FIG. 8 is a perspective view illustrating an embodiment of a user interacting with the augmented reality element of FIG. 6.

Referring now to FIG. 8, in this second embodiment of block 406, the user may move their hand 702 into the three-dimensional volume 500 located adjacent the physical display device 204 and perform a hand gesture B that, in FIG. 8, is illustrated as a "pinch" gesture, and that is followed by a rotational movement of the hand 702. The user tracking sub-engine 304a may receive the user tracking information generated by the user tracking subsystem 208a and 208b in response to that hand movement and provide that user tracking information to the three-dimensional visualization sub-engine 304c. The three-dimensional visualization sub-engine 304c may also receive image information generated by the camera(s) 210c on the augmented reality display subsystem 210 in response to that hand movement. The three-dimensional visualization sub-engine 304c may then analyze the user tracking information, the image information, and/or any other available information to detect the hand gesture B being performed within the three-dimensional volume 500, followed by the rotational movement of the hand 702. In the specific embodiment illustrated in FIG. 8, the hand gesture B is detected adjacent the augmented reality element X-axis 700a prior to the rotational movement of the hand 702, and that hand gesture B and augmented reality element X-axis 700a may be associated with each other.

Furthermore, as also illustrated in FIG. 8, a user interaction may be detected via totem device information generated in response to rotational movement of the totem device 212. For example, the user may use their hand to rotate the totem device 212 in a plane as illustrated, and that rotational movement may be reported to the three-dimensional visualization sub-engine 304c as totem device information (e.g., reported directly by the totem device 212, detected and reported by the user tracking sub-engine 304a, etc.) As such, at block 406, the three-dimensional visualization sub-engine 304c may use the totem device information generated via rotational movement of the totem device 212 to detect the at least one user interaction with the augmented reality element 600.

In the second embodiment, the method 400 may then proceed to block 408 where the computing system uses the augmented reality display subsystem to modify the display of the augmented reality element in the three dimensional volume adjacent the physical display device based on the user interaction. In an embodiment of block 408, the three-dimensional visualization sub-engine 304c may determine that the user interaction detected at block 406 and, in response, modify the display of the augmented reality element 600 in the three dimensional volume 500. In this example, the hand gesture A is a pinch gesture that is performed adjacent the augmented reality element X-axis 700a, and is followed by rotational movement of the hand 702 about the augmented reality element X-axis 700a. Based on that detected user interaction with the augmented reality element 600, the augmented reality visualization sub-engine 304c may modify the display of the augmented reality element 600 provided by the augmented reality display subsystem 210 to cause the augmented reality element 600 to appear to perform a rotational movement within the three-dimensional volume 500 and about that augmented reality element X-axis 700a.

In the second embodiment, the method 400 may then proceed to block 410 where the computing system uses the physical display device to modify the display of the two dimensional element that is coordinated with the augmented reality element. With reference to FIG. 8, the rotational movement of the augmented reality element 600 may cause the two-dimensional visualization sub-engine 304b to modify the display of the two-dimensional element 602. For example, as discussed above, the two-dimensional element 602 may be coordinated with the augmented reality element 600 by providing a cross-sectional view of the augmented reality element 600, and in this example that cross-sectional view may be defined by a horizontally oriented static plane (e.g., a plane that includes the augmented reality element X-axis 700a and the augmented reality element Y-axis 700b in FIG. 7A, and that is parallel to the display screen 204a) that intersects the augmented reality element 600. In response to the rotational movement of the augmented reality element 600, the relative orientation of the augmented reality element 600 and that static plane may change, and result in the coordinated display of the two-dimensional element 704 that provides a different cross-section of the augmented reality element 602 as it rotates. One of skill in the art in possession of the present disclosure will recognize how a cross-sectional view of the augmented reality element 600 may be provided with a vertical static plane (i.e., a static plane that includes the augmented reality element Y-axis 700b and the augmented reality element Z-axis 700c in FIG. 7A, and that is perpendicular to the display screen 204a) in substantially the same manner as described above.

In other examples, the coordinated modification of the two-dimensional element 602 with the augmented reality element 600 may include providing a modified projected view of the augmented reality element 600. For example, the two-dimensional element 704 may provide a projected view of the augmented reality element 600 that illustrates different portions of the surface of the augmented reality element 600 as it rotates (possible about the augmented reality element X-axis 700a or the augmented reality element Y-axis 700c rather than the augmented reality element Z-axis 700c in the illustrated embodiment), a projected view that illustrates a shadow cast by the augmented reality element 602 as it rotates (e.g., in response to the augmented reality light source that may be positioned as desired by the user), and/or that illustrated a variety of other projected views that would be apparent to one of skill in the art in possession of the present disclosure.

In yet other examples, the coordinated modification of the two-dimensional element 602 with the augmented reality element 600 may include a modified surface-engagement view of the augmented reality element 600. As discussed above, augmented reality element 600 may include a textured surface (not illustrated), and the two-dimensional element 704 may provide a surface-engagement view of the augmented reality element 600 that illustrates how the textured surface of the augmented reality element 602 would engage a support surface as the augmented reality element 602 rotates, the amount of force that would be experienced by different portions of the textured surface of the augmented reality element 602 as it rotates when engaging a support surface, and/or a variety of other surface-engagement views that would be apparent to one of skill in the art in possession of the present disclosure. While specific examples of the display of modified coordination of the display of two-dimensional elements with augmented reality elements have been described, one of skill in the art in possession of the present disclosure will recognize that a variety of techniques for rendering such modified coordinated two-dimensional elements/augmented reality elements will fall within the scope of the present disclosure as well.

In a third embodiment, the method 400 may proceed to block 406 where the computing system detects a user interaction with the augmented reality element. In the third embodiment, at block 406, the user tracking sub-engine 304a in the augmented reality display engine 304 may receive user tracking information that may be generated by the user tracking subsystem 208a and 208b (e.g., user tracking information related to the location, orientation, and/or movement of any part of the user's body detectable by the user tracking subsystem 208a and 208b), and/or generated by any other component in the system 200. The user tracking sub-engine 304a may then provide that user tracking information to the three-dimensional visualization sub-engine 304c. Furthermore, at block 406 the three-dimensional visualization sub-engine 304c in the augmented reality display engine 304 may receive image information from the cameras 210c on the augmented reality display subsystem 210. Further still, at block 406 the three-dimensional visualization sub-engine 304c in the augmented reality display engine 304 may receive pen device information from the pen device 214. At block 406, the three-dimensional visualization sub-engine 304c may then use the user tracking information, the image information, the pen device information, and/or any other available information to detect at least one user interaction with the augmented reality element 600.

Figure 9:
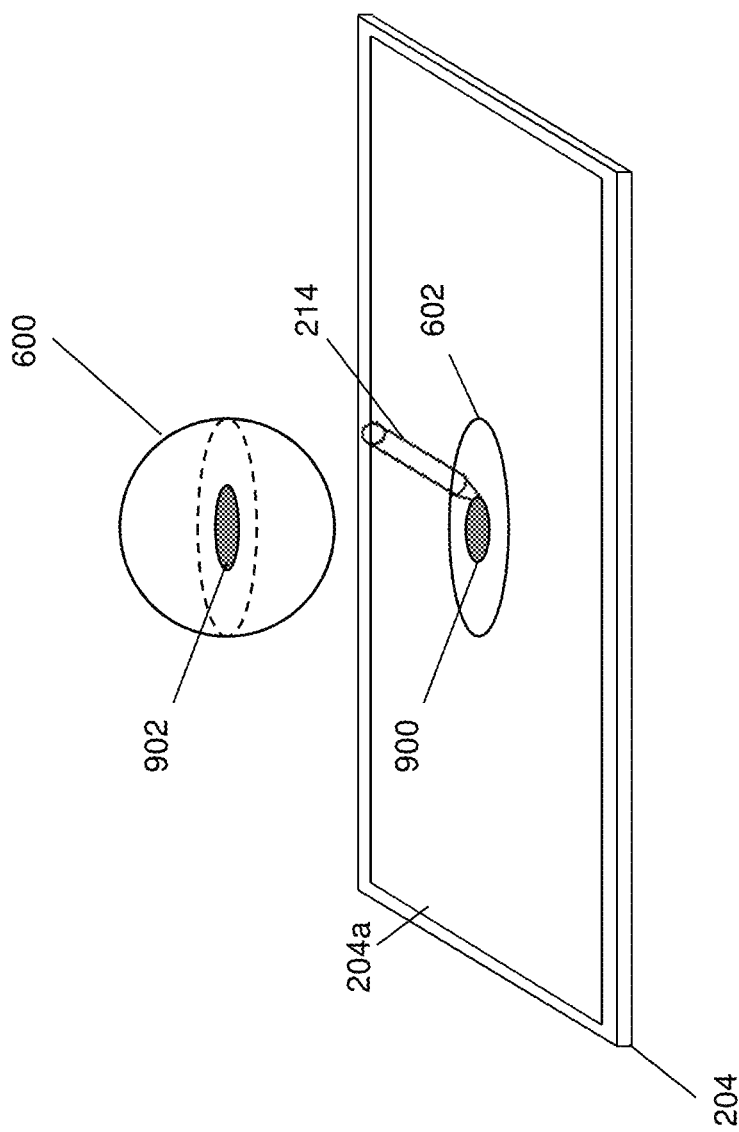
FIG. 9 is a perspective view illustrating an embodiment of a user interacting with the augmented reality element of FIG. 6 in a manner that is coordinated with the display on the physical display device.

Referring now to FIG. 9, in this third embodiment of block 406, the user may utilize the pen device 214 with the display screen 204a of the physical display device 204 and perform a pen device action that, in FIG. 9, is illustrated as including drawing a feature 900 on the two-dimensional element 602. The user tracking sub-engine 304a may receive the user tracking information generated by the user tracking subsystem 208a and 208b in response to that pen device action, and provide that user tracking information to the two-dimensional visualization sub-engine 304b. The two-dimensional visualization sub-engine 304b may also receive image information generated by the camera(s) 210c on the augmented reality display subsystem 210 in response to that pen device action, and the pen device 214 may report to the two-dimensional visualization sub-engine 304b (or the two-dimensional visualization sub-engine 304b may detect) pen device information that describes that pen device action. The two-dimensional visualization sub-engine 304b may then analyze the user tracking information, the image information, the pen device information, and/or any other available information to detect the pen device action being performed on the two-dimensional element 602. In some embodiments, the two-dimensional visualization engine 304b may be configured to recognize when a user's palm is engaging the display screen 204a along with the pen device 214, and operate to disregard that engagement of the user's palm.

In the third embodiment, the method 400 may then proceed to perform functionality that is similar to that described above for block 408, with the exception that in this embodiment the computing system uses the physical display device to modify the display of the two-dimensional element displayed on the physical display device based on the user interaction. In an embodiment of block 408, the two-dimensional visualization sub-engine 304b may determine that the user interaction detected at block 406 and, in response, modify the display of the two-dimensional element 602 displayed on the physical display device 204. In this example, the pen device action is performed on the two-dimensional element 602 that is providing a cross-section of the augmented reality element 600, and operates to add a feature 900 to (or otherwise modify) that cross-section of the augmented reality element 600. In some embodiments, the two-dimensional visualization engine 304b may be configured to recognize when a user's palm is engaging the display screen 204a along with the pen device 214, and operate to disregard that engagement of the user's palm.

In the third embodiment, the method 400 may then proceed to perform functionality that is similar to that described above for block 410, with the exception that the computing system modifies the display of the augmented reality element 600 in a manner that is coordinated with the two-dimensional element 602. With reference to FIG. 9, the feature 900 added on the two-dimensional element 602 via the pen device action may cause the three-dimensional visualization sub-engine 304c to modify the display of the augmented reality element 600. For example, as discussed above, the two-dimensional element 602 may be coordinated with the augmented reality element 600 by providing a cross-sectional view of the augmented reality element 600, and in this example the feature 900 added to that cross-sectional view may be projected onto or otherwise coordinated with the augmented reality element 600 to provide a feature 902. Furthermore, such pen device actions may be combined with the rotational movement of the augmented reality element 600 such as, for example, by using the pen device 214 to draw the feature 900 as the relative orientation of the augmented reality element 602 in the three-dimensional volume 500, and result in the adding of the feature 900 to different cross-sections of the augmented reality element 602 as it rotates (e.g., to draw a three-dimensional feature within the augmented reality element 600.)

In a fourth embodiment, the method 400 may proceed to block 406 where the computing system detects a user interaction with the augmented reality element. In the fourth embodiment, at block 406, the user tracking sub-engine 304a in the augmented reality display engine 304 may receive user tracking information that may be generated by the user tracking subsystem 208a and 208b (e.g., user tracking information related to the location, orientation, and/or movement of any part of the user's body detectable by the user tracking subsystem 208a and 208b), and/or generated by any other component in the system 200. The user tracking sub-engine 304a may then provide that user tracking information to the three-dimensional visualization sub-engine 304c. Furthermore, at block 406 the three-dimensional visualization sub-engine 304c in the augmented reality display engine 304 may receive image information from the cameras 210c on the augmented reality display subsystem 210. Further still, at block 406 the three-dimensional visualization sub-engine 304c in the augmented reality display engine 304 may receive pen device information from the pen device 214. At block 406, the three-dimensional visualization sub-engine 304c may then use the user tracking information, the image information, the pen device information, and/or any other available information to detect at least one user interaction with the augmented reality element 600.

Figure 10:
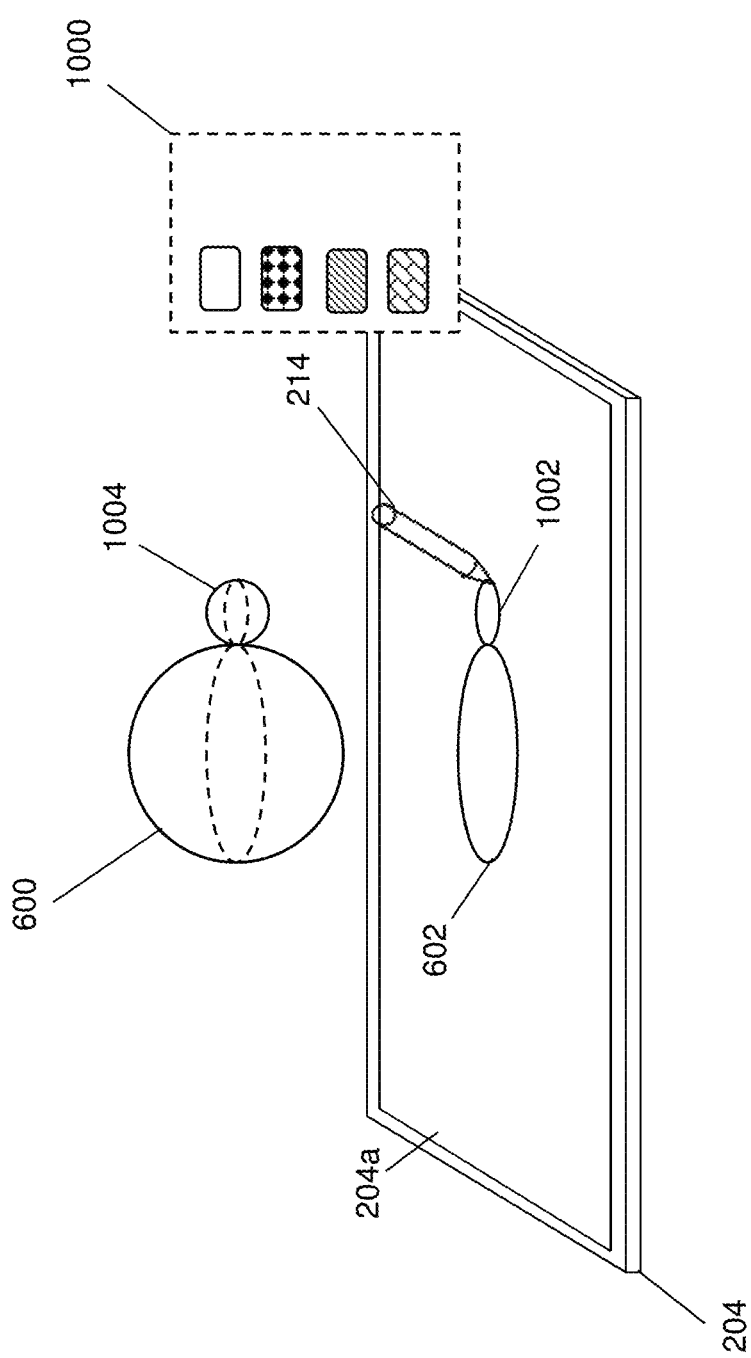
FIG. 10 is a perspective view illustrating an embodiment of a user interacting with the augmented reality element of FIG. 6 in a manner that is coordinated with the display on the physical display device.

Referring now to FIG. 10, in this fourth embodiment of block 406, the three-dimensional visualization sub-engine 304c may operate to use the augmented reality display subsystem 210 to provide an additional augmented reality element 1000 for display such that it appears to be located in the secondary zone and at least partially outside of the three-dimensional volume 500. In the illustrated embodiment, the additional augmented reality element 1000 is a menu-type augmented reality element panel that may allow the user to select between different colors, textures, and/or other features that may be applied to the augmented reality element 600. For example, such menu-type augmented reality elements may be utilized to "drag and drop" colors, textures, and/or other features from the menu-type augmented reality element to the augmented reality element 600 (e.g., a red color from the menu-type augmented reality element may be dragged through the three-dimensional volume 500 and dropped on the augmented reality element 600 to result in the augmented reality element being displayed in that red color.) However, one of skill in the art in possession of the present disclosure will recognize how additional augmented reality elements may be provided in the second zone, the tertiary zone, or other zones, in order to provide a variety of functionality that will fall within the scope of the present disclosure.

As illustrated in FIG. 10, the user may utilize the pen device 214 with the display screen 204a of the physical display device 204 and perform a pen device action that, in FIG. 10, is illustrated as including adding a feature 1002 to the two-dimensional element 602. The user tracking sub-engine 304a may receive the user tracking information generated by the user tracking subsystem 208a and 208b in response to that pen device action, and provide that user tracking information to the two-dimensional visualization sub-engine 304b. The two-dimensional visualization sub-engine 304b may also receive image information generated by the camera(s) 210c on the augmented reality display subsystem 210 in response to that pen device action, and the pen device 214 may report to the two-dimensional visualization sub-engine 304b (or the two-dimensional visualization sub-engine 304b may detect) pen device information that describes that pen device action. The two-dimensional visualization sub-engine 304b may then analyze the user tracking information, the image information, the pen device information, and/or any other available information to detect the pen device action being performed on the two-dimensional element 602. In some embodiments, the two-dimensional visualization engine 304b may be configured to recognize when a user's palm is engaging the display screen 204a along with the pen device 214, and operate to disregard that engagement of the user's palm.

In the fourth embodiment, the method 400 may then proceed to perform functionality that is similar to that described above for block 408, with the exception that in this embodiment the computing system uses the physical display device to modify the display of the two-dimensional element displayed on the physical display device based on the user interaction. In an embodiment of block 408, the two-dimensional visualization sub-engine 304b may determine that the user interaction detected at block 406 and, in response, modify the display of the two-dimensional element 602 displayed on the physical display device 204. In this example, the pen device action is performed on the two-dimensional element 602 that is providing a projection of the augmented reality element 600, and operates to add a feature 1002 to (or otherwise modify) that projection of the augmented reality element 600. In some embodiments, the two-dimensional visualization engine 304b may be configured to recognize when a user's palm is engaging the display screen 204a along with the pen device 214, and operate to disregard that engagement of the user's palm.

In the fourth embodiment, the method 400 may then proceed to perform functionality that is similar to that described above for block 410, with the exception that the computing system modifies the display of the augmented reality element 600 in a manner that is coordinated with the two-dimensional element 602. With reference to FIG. 10, the feature 1002 added on the two-dimensional element 602 via the pen device action may cause the three-dimensional visualization sub-engine 304c to modify the display of the augmented reality element 600. For example, as discussed above, the two-dimensional element 602 may be coordinated with the augmented reality element 600 by providing a projection view of the augmented reality element 600, and in this example the feature 1002 added to that projection view may be projected onto or otherwise coordinated with the augmented reality element 600 to add an augmented reality element feature 1004 (a three-dimensional feature in this example.) Furthermore, such pen device actions may be combined with the translational or rotational movement of the augmented reality element 600 such as, for example, by using the pen device 214 as the relative position and/or orientation of the augmented reality element 602 within the three-dimensional volume 500 changes, and result in the adding of the feature 1004 to the augmented reality element 602 as it translates or rotates.

Figure 11:
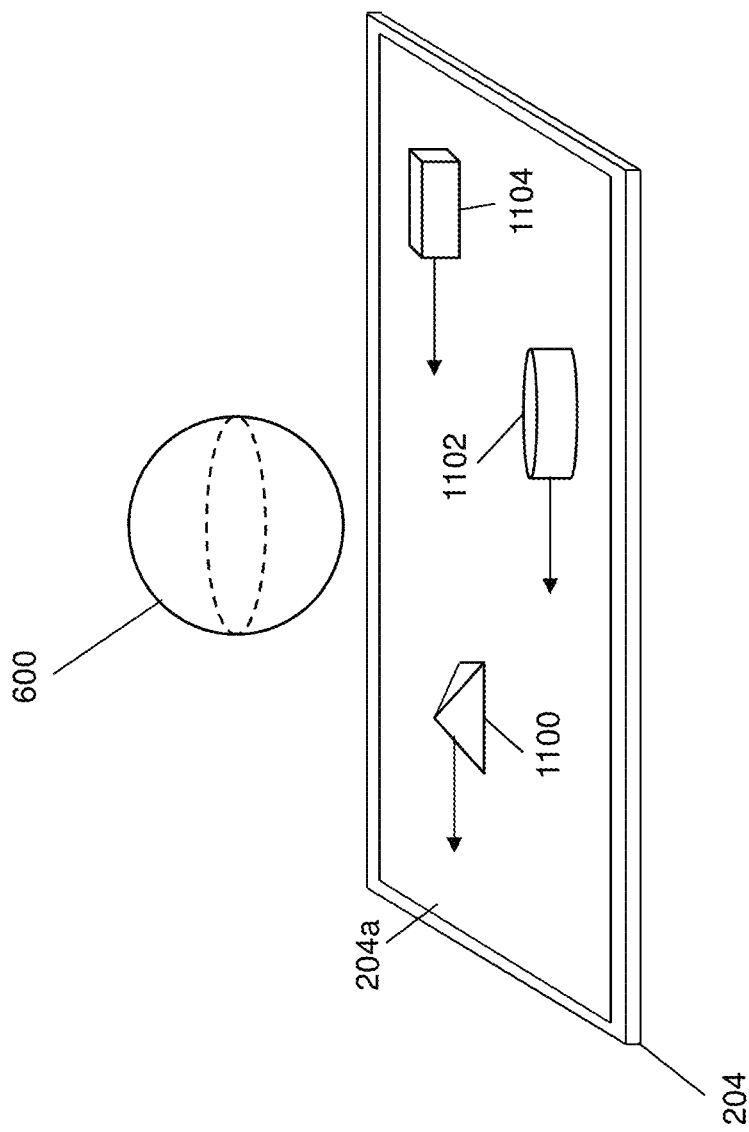
FIG. 11 is a perspective view illustrating an embodiment of the augmented reality element of FIG. 6 coordinated with the display on the physical display device.

Referring now to FIG. 11, in yet another embodiment, the two-dimensional visualization sub-engine 304b and the three-dimensional visualization sub-engine 304c may operate to display the augmented reality element 600 relative to other features 1100, 1102, and 1104 that are displayed via the physical display device 204 and/or the augmented reality display subsystem 210 such that they appears to move relative to the augmented reality element 600. One of skill in the art in possession of the present disclosure will recognize how the techniques described in the embodiments above may be utilized to display how motion of the augmented reality element effects surfaces, cross sections, and/or other features of the augmented reality element 600. For example, the effects of a fluid flow around the augmented reality element 600 may be visualized via movement of fluid by the augmented reality element 600, and details of the effects on that fluid flow may be displayed via coordinated two-dimensional elements displayed on the display device 204.

Thus, systems and methods have been described that provide for the integration of an augmented reality workspace with one or more physical display devices in order to provide an immersive workspace experience that coordinates the display of augmented reality elements with the display of two-dimensional elements on a physical display device. As such, productivity increases in the design of products using three-dimensional elements displayed via the augmented reality display subsystem may be enhanced by providing for the display of "projections" of the three-dimensional element onto the physical display device using the two-dimensional element displayed thereon, allowing for the visualization of cross-sections of the product being designed, engagement surfaces on the product being designed, and/or a variety of other benefits that will be apparent to one of skill in the art in possession of the present disclosure. Furthermore, the system may be enhanced using peripheral devices such a totems, which allow for manipulation of the three-dimensional element displayed via the augmented reality display subsystem, and pens, which may be utilized with the physical display device to allow for the augmentation of three-dimensional element displayed via the augmented reality display subsystem.

While several features of the augmented reality workspace system have been described, one of skill in the art in possession of the present disclosure will recognize that a variety of other features may be provided while remaining within the scope of the present disclosure. For example, the computing system may be configured to detect when the augmented reality display subsystem is being utilized and, in the event it is not, the computing system may disable the processing performed by the three-dimensional visualization sub-engine 304c in order to, for example, conserve processing power (i.e., by only enabling the display of images on the display screen 204a of the physical display device 204.) Furthermore, haptic transducers and/or other haptic devices may be provided on the physical display device in the augmented reality display subsystem, and/or as part of the totem device and/or pen device, in order to provide haptic feedback to a user that is utilizing the augmented reality workspace system as described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A physical display device integrated augmented reality workspace system, comprising:
    a physical display device;
    an augmented reality display subsystem; and
    a computing system including a processor that is coupled to the physical display device and the augmented reality display subsystem, wherein the computing system is configured to:
        define, based on physical display device information associated with the physical display device, a three-dimensional volume that is immediately adjacent the physical display device and that remains stationary relative to the physical display device when the augmented reality display subsystem moves relative to the physical display device;
        provide, for display on the augmented reality display subsystem and in order to appear to be located in the three-dimensional volume immediately adjacent the physical display device as viewed through the augmented reality display subsystem, a first augmented reality element;
        provide, for display on the physical display device, a two-dimensional element that is coordinated with the first augmented reality element displayed on the augmented reality display subsystem;
        identify at least one first user interaction with the two-dimensional element displayed on the physical display device;
        modify, in response to the at least one first user interaction, the display of the two-dimensional element displayed on the physical display device; and
        modify, in response to the at least one first user interaction, the display of the first augmented reality element by the augmented reality display subsystem in a manner that is coordinated with the modification of the display of the two-dimensional element displayed on the physical display device.

2. The physical display device integrated augmented reality workspace system of claim 1, wherein the first augmented reality element is displayed in order to appear as a three-dimensional object that is located adjacent the physical display device as viewed through the augmented reality display subsystem.

3. The physical display device integrated augmented reality workspace system of claim 1, further comprising:
    a user tracking subsystem coupled to the computing system, wherein the computing system is configured to:
        receive, from the user tracking subsystem, first user tracking information;
        analyze the first user tracking information to identify the at least one first user interaction with the two-dimensional element displayed on the physical display device.

4. The physical display device integrated augmented reality workspace system of claim 1, wherein the two-dimensional element is coordinated with the first augmented reality element by displaying a cross section of the first augmented reality element.

5. The physical display device integrated augmented reality workspace system of claim 1, wherein the computing system is configured to:
    identify at least one second user interaction with the two-dimensional element displayed on the physical display device;
    modify, in response to the at least one second user interaction, the display of the two-dimensional element displayed on the physical display device; and
    modify, in response to the at least one second user interaction, the display of the first augmented reality element by the augmented reality display subsystem in a manner that is coordinated with the modification, in response to the at least one second user interaction, of the display of the two-dimensional element displayed on the physical display device.

6. The physical display device integrated augmented reality workspace system of claim 1, wherein the modification of the display of the two-dimensional element includes modifying an area occupied by the two-dimensional element displayed on the physical display device, and wherein the modification of the display of the first augmented reality element includes modifying a display of a virtual volume of the first augmented reality element by the augmented reality display subsystem.

7. An Information Handling System (IHS), comprising:
    a processing system including a processor; and
    a memory system that includes system memory and that is coupled to the processing system and that includes instructions that, when executed by the processing system, cause the processing system to provide an augmented reality display engine that is configured to:
        define, based on physical display device information associated with a physical display device, a three-dimensional volume that is immediately adjacent the physical display device and that remains stationary relative to the physical display device when an augmented reality display subsystem moves relative to the physical display device;
        provide, for display on the augmented reality display subsystem and in order to appear to be located in the three-dimensional volume immediately adjacent the physical display device as viewed through the augmented reality display subsystem, a first augmented reality element;

provide, for display on the physical display device, a two-dimensional element that is coordinated with the first augmented reality element displayed on the augmented reality display subsystem;

identify at least one first user interaction with the two-dimensional element displayed on the physical display device;

modify, in response to the at least one first user interaction, the display of the two-dimensional element displayed on the physical display device; and modify, in response to the at least one first user interaction, the display of the first augmented reality element by the augmented reality display subsystem in a manner that is coordinated with the modification of the display of the two-dimensional element displayed on the physical display device.

8. The IHS of claim 7, wherein the first augmented reality element is displayed in order to appear as a three-dimensional object that is located adjacent the physical display device as viewed through the augmented reality display subsystem.

9. The IHS of claim 7, wherein the augmented reality display engine is configured to:

receive, from a user tracking subsystem, first user tracking information;

analyze the first user tracking information to identify the at least one first user interaction with the two-dimensional element displayed on the physical display device.

10. The IHS of claim 9, wherein the first user tracking information is received from a physical user interaction device that includes at least one of a totem device and a pen device.

11. The IHS of claim 7, wherein the two-dimensional element is coordinated with the first augmented reality element by displaying a cross section of the first augmented reality element.

12. The IHS of claim 7, wherein the augmented reality display engine is configured to:

identify at least one second user interaction with the two-dimensional element displayed on the physical display device;

modify, in response to the at least one second user interaction, the display of the two-dimensional element displayed on the physical display device; and modify, in response to the at least one second user interaction, the display of the first augmented reality element by the augmented reality display subsystem in a manner that is coordinated with the modification, in response to the at least one second user interaction, of the display of the two-dimensional element displayed on the physical display device.

13. The IHS of claim 7, wherein the modification of the display of the two-dimensional element includes modifying an area occupied by the two-dimensional element displayed on the physical display device, and wherein the modification of the display of the first augmented reality element includes modifying a display of a virtual volume of the first augmented reality element by the augmented reality display subsystem.

14. A method for providing an augmented reality workspace that is integrated with a physical display device, comprising:

defining, by a computing system based on physical display device information associated with the physical display device, a three-dimensional volume that is immediately adjacent the physical display device and that remains stationary relative to the physical display device when an augmented reality display subsystem moves relative to the physical display device;

providing, by the computing system for display on the augmented reality display subsystem and in order to appear to be located in the three-dimensional volume immediately adjacent the physical display device as viewed through the augmented reality display subsystem, a first augmented reality element;

providing, by the computing system for display on the physical display device, a two-dimensional element that is coordinated with the first augmented reality element displayed on the augmented reality display subsystem;

identifying, by the computing system, at least one first user interaction with the two-dimensional element displayed on the physical display device;

modifying, by the computing system in response to the at least one first user interaction, the display of the two-dimensional element displayed on the physical display device; and modifying, by the computing system in response to the at least one first user interaction, the display of the first augmented reality element by the augmented reality display subsystem in a manner that is coordinated with the modification of the display of the two-dimensional element displayed on the physical display device.

15. The method of claim 14, wherein the first augmented reality element is displayed in order to appear as a three-dimensional object that is located adjacent the physical display device as viewed through the augmented reality display subsystem.

16. The method of claim 14, further comprising:

receiving, by the computing system from a user tracking subsystem, first user tracking information;

analyzing, by the computing system, the first user tracking information to identify the at least one first user interaction with the two-dimensional element displayed on the physical display device.

17. The method of claim 16, wherein the first user tracking information is received from a physical user interaction device that includes at least one of a totem device and a pen device.

18. The method of claim 14, wherein the two-dimensional element is coordinated with the first augmented reality element by displaying a cross section of the first augmented reality element.

19. The method of claim 14, further comprising:

identifying, by the computing system, at least one second user interaction with the two-dimensional element displayed on the physical display device;

modifying, by the computing system in response to the at least one second user interaction, the display of the two-dimensional element displayed on the physical display device; and modifying, by the computing system in response to the at least one second user interaction, the display of the first augmented reality element by the augmented reality display subsystem in a manner that is coordinated with the modification, in response to the at least one second user interaction, of the display of the two-dimensional element displayed on the physical display device.

20. The method of claim 14, wherein the modification of the display of the two-dimensional element includes modifying an area occupied by the two-dimensional element displayed on the physical display device, and wherein the modification of the display of the first augmented reality element includes modifying a display of a virtual volume of the first augmented reality element by the augmented reality display subsystem.

\* \* \* \* \*